United States Patent [19]

Bogar et al.

[11] 3,792,450

[45] Feb. 12, 1974

[54] SYSTEM FOR OVERCOMING FAULTS IN MAGNETIC ANISOTROPIC MATERIAL

[75] Inventors: Joseph E. Bogar, Parsipanny, N.J.; John K. Bragg, New York, N.Y.; George H. Hare, North Caldwell, N.J.

[73] Assignee: The Singer Company, New York, N.Y.

[22] Filed: May 8, 1972

[21] Appl. No.: 250,944

[52] U.S. Cl. .................... 340/174 ED, 340/174 TF

[51] Int. Cl. ... G11c 29/00, G11c 11/14, G11c 19/00

[58] Field of Search ... 235/153; 340/174 TF, 174 SR, 340/174 ED, 173 R, 172.5

[56] References Cited

UNITED STATES PATENTS

| | | | |
|---|---|---|---|
| 3,234,521 | 2/1966 | Weisbecker | 340/172.5 |
| 3,573,751 | 4/1971 | DeLisle | 340/172.5 |
| 3,618,054 | 11/1971 | Bonyhard | 340/174 TF |

*Primary Examiner*—Stanley M. Urynowicz, Jr.
*Attorney, Agent, or Firm*—Marshall J. Breen; Chester A. Williams, Jr.

[57] ABSTRACT

Mass memories using magnetic domain storage devices suffer from the large number of flaws found in the storage medium. This invention comprises a system for identifying and isolating those channels in a mass memory medium which contain flaws and for controlling the storage of information in the medium to avoid those channels. The system comprises the storage material having, in addition to the normal information storage registers, additional registers which contain the identification of those storage channels which contain flaws. This identification is in the form of bits of data whose movements are synchronized with the movements of the information stored in the memory, and which identification blocks the transfer of information into defective channels. During the initial testing of the mass memory, information is stored in each of the information storage channels, and that information is subsequently read out. The information which is read out is used as a word in a separate channel identification register to identify those channels which do not contain flaws. The information stored in the channel identification register is read during normal circulation of information through the transfer loop, and the presence of channel identification in that register opens loading gates to permit the loading of information into good channels and to prevent the loading of information into defective channels.

29 Claims, 14 Drawing Figures

PRIOR ART

PATENTED FEB 12 1974

3,792,450

SHEET 06 OF 10

PATENTED FEB 12 1974 3,792,450

SHEET 07 OF 10

PATENTED FEB 12 1974

3,792,450

SHEET 09 OF 10

SYSTEM FOR OVERCOMING FAULTS IN MAGNETIC ANISOTROPIC MATERIAL

Figure 1:
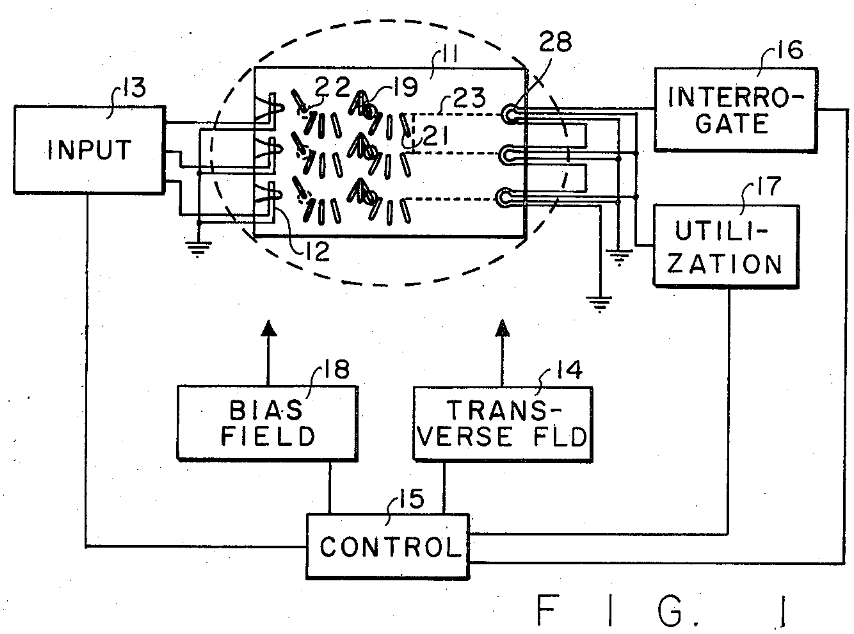
PRIOR ART FIG. 1

This invention relates to information storage devices, and more particularly to storage devices in which information is stored in potentially defective media, and to a method for storing information in such apparatus.

Recent improvements in equipment for electronic data processing (EDP) have provided the data processing designer with high-speed, reliable hardware. The newly developed electronic components, particularly those using integrated circuit techniques, have greatly increased the capacity of modern EDP equipment to process data. As the speed and capacity of processing increases, the data storage requirements also increase. At present, there are six major means for storing large quantities of digital data. These are punched cards, punched tape, magnetic tape, magnetic drum, magnetic disk, and magnetic cores.

The oldest of these mass memory devices is the punched card which was not new to Charles Babbage (c. 1865) who used a form of punched card to store information and instructions for his calculating engines. When larger and faster memories were required, the cards were, in effect, connected end-to-end to form a long punched tape. Both the punched cards and the punched tapes are usually read by conductive fingers which penetrate the perforations to make electrical contacts. A faster mass storage medium using tape is the magnetic tape memory system. Digital data can be stored in very close packing on magnetic tape to provide huge, quantities of storage in a relatively small space. Since the reading from and the writing on the tape is electromagnetic in nature, it is both fast and non-wearing on the tape. In addition, information stored on magnetic tape readily can be changed to correct errors without destroying the tape or the information. As the length of the magnetic tape increases, the average time to locate and read a particular word also increases. Endless loops of magnetic tape provide much shorter access times but require much more operating equipment. A rotating magnetic drum can be considered as a large number of magnetic tapes mounted side-by-side on a rigid support member. Each track on a magnetic drum is equivalent to a magnetic tape loop, and each has its own reading and writing heads. Thus, the magnetic drum provides a means for storing a large amount of digital data while still providing more rapid access to the data stored thereon than was available with prior mass storage media. But the magnetic drum carries information recorded only on its surface. This is, in a sense, a waste of space. If the drum was solid, and if it was sliced laterally and the slices were separated, it would be feasible to record data on the end surfaces of each of the disks thus formed. This is equivalent to the present magnetic disk storage devices which store large amounts of data in relatively small volumes. The disk storage; however, still suffers from the inherent time required before access can be had to any individual bit or word stored thereon. Magnetic core storage, and its new counterpart, solid-state storage, provide mass storage devices of digital data which permit random access to any particular bit or word stored therein. The time required to read any stored bit of information is only the time required for the electronic circuits to operate. As the storage devices have increased in speed, they also, generally, have increased in cost so that considering the memories discussed above, it can be said as a general rule that the cost per bit of information stored is cheapest with the slowest devices and most expensive with the fastest devices. However, the cost per bit of information stored in all of these systems has continued to decrease. At present, there is a gap between the cost of stored information on magnetic disks tape, and the like with the large time required to access that information and stored information in cores, semi-conductors and the like with the small times required to access that information; and the cost of stored information in magnetic films which store information in movable magnetic domains, and which may fill the gap in both cost and speed.

In recent years, Andrew H. Bobeck of Bell Telephone Laboratories, Inc., and his associates have been working with thin magnetic film storage devices. They have discovered that some anisotropic magnetic materials can have areas of magnetization perpendicular to the plane of the material with the magnetization divided equally among the areas which are magnetized in opposite directions. These areas are separated by transition areas of small widths commonly called domain walls. They have also found that the application of a magnetic field at right angles to the plane of the magnetic material causes the domain walls to contract, the amount of contraction increasing with the strength of the magnetic field. As the bias field increases in strength, the domain walls shrink until they surround small circular areas all having the same direction of magnetization. These are called magnetic "bubbles." A further increase in the magnetic field strength causes the bubbles to disappear completely. The bubbles readily can be moved through the magnetic material by the application of very small magnetic force parallel to the plane of the material. Since the bubbles tend to be stable within the magnetic material, a tiny unbalancing magnetic force will cause them to move rapidly through the material.

Channels for the movement of bubbles can be defined in the magnetic material by mounting on a surface of the thin magnetic film tiny areas of magnetic material such as Permaloy. These small spots of Permalloy provide areas with less magnetic reluctance than the surrounding material and act as anchors for the magnetic bubbles. By arranging the small Permalloy spots in channels which form loops on the surface of the thin magnetic film, paths of movement for the magnetic bubbles are defined.

Some of the thin magnetic films which have been found particularly suitable for this purpose are garnets. The difficulty in growing single crystals from a supersaturated solution or drawing perfect crystals from a melt are well known. To date, all such structures used for thin magnetic films contain randomly distributed magnetostatic flaws-flaws which tend to prevent movement of magnetic bubbles within the film. When these flaws appear astride a channel, information inserted into that channel is lost because the flaw prevents that information from ever completing its loop around the channel and reappearing at the output. Because of the flaws in the material, present mass memory devices of thin anisotropic magnetic material are limited in size with the upper limits being that area of film which has a statistically significant likelihood of being flaw free.

It is an object of this invention to provide a new and improved storage system for digital information.

It is another object of this invention to provide a new and improved thin magnetic film mass storage device for storing digital information.

It is a further object of this invention to provide a new and improved system for overcoming the existence of flaws in thin film magnetic storage media.

It is still another object of this invention to provide a new and improved flaw tolerant information storage system.

Figure 2:
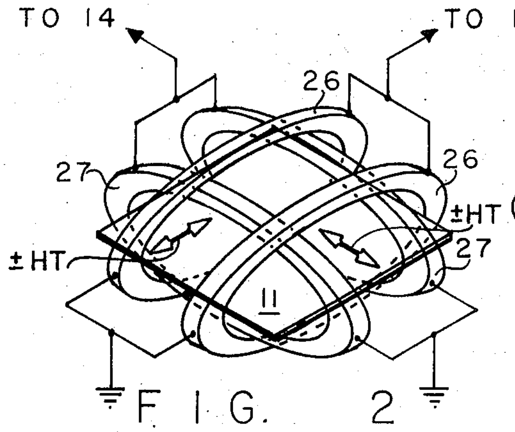
FIG. 2 PRIOR ART
Figure 3:
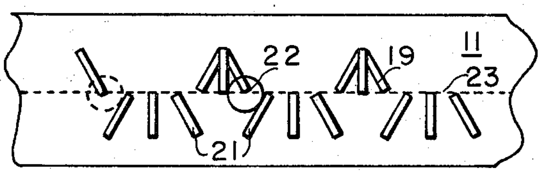
Figure 4:
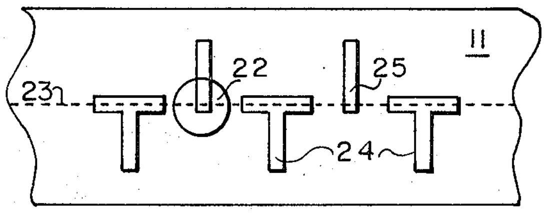
FIG. 4 PRIOR ART
Figure 5:
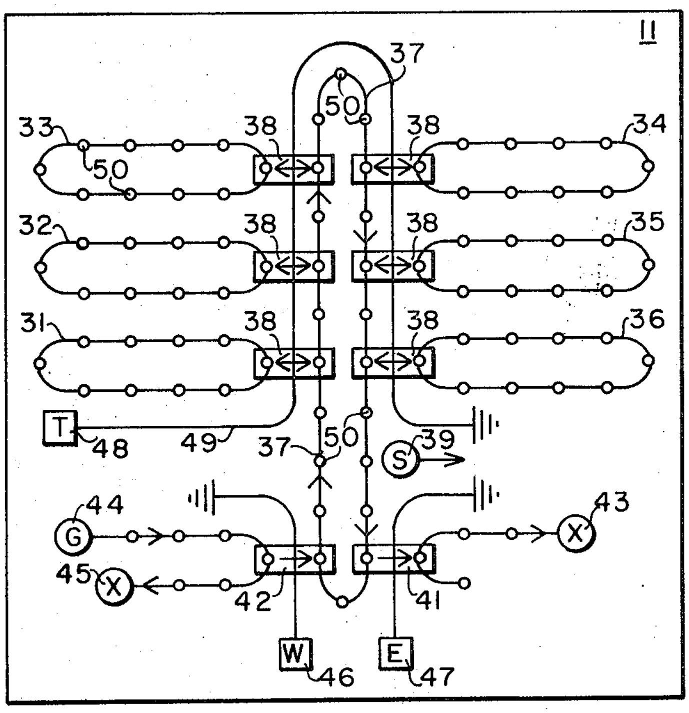
Figure 10:
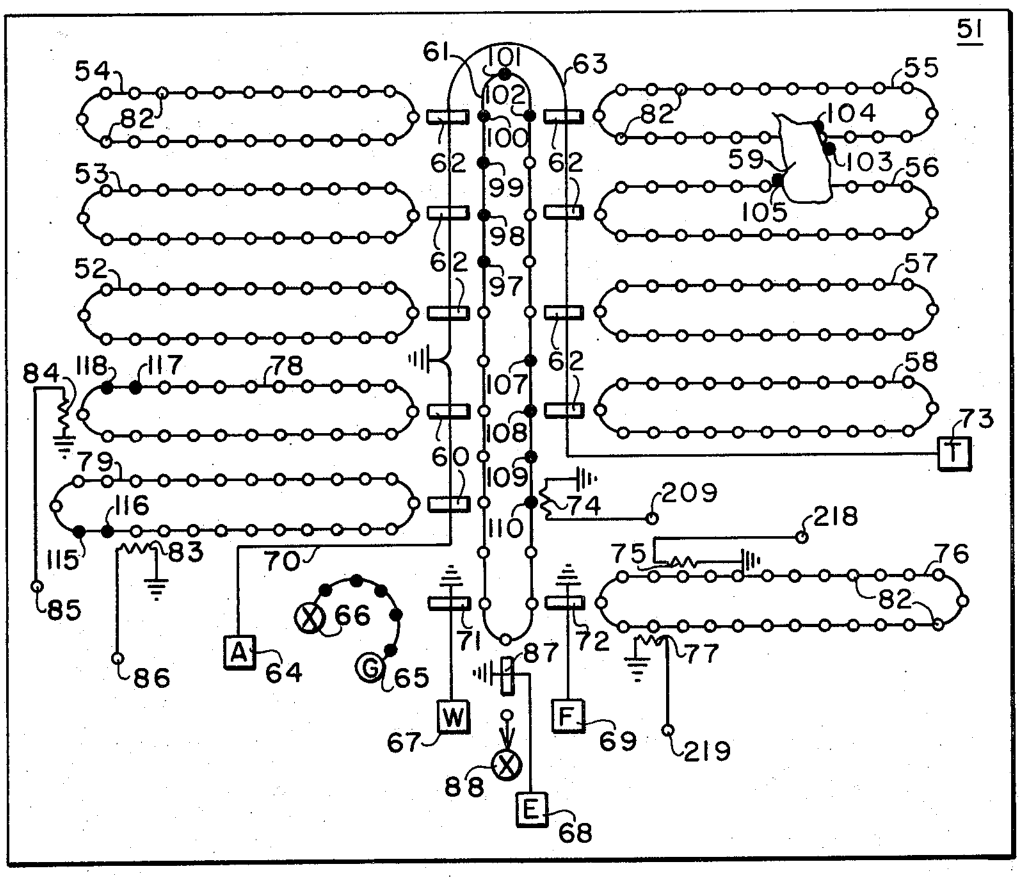
Figure 11:
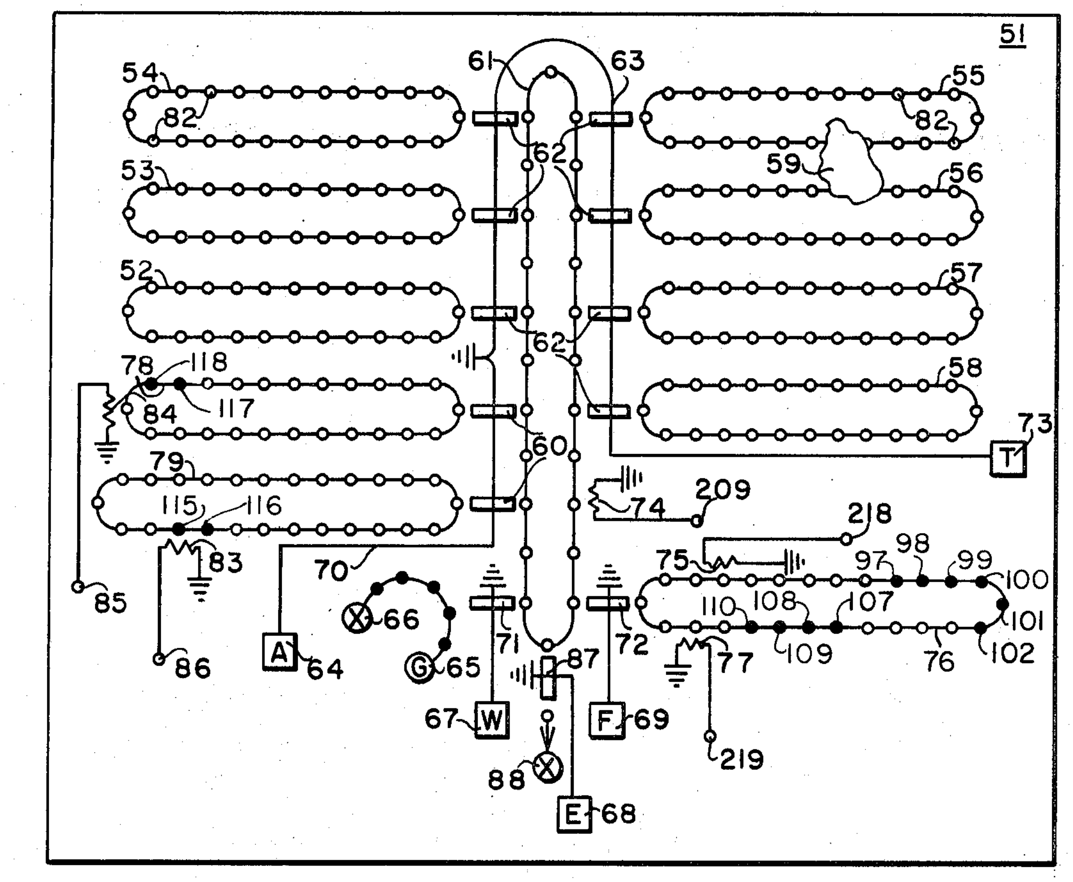
Figure 12A:
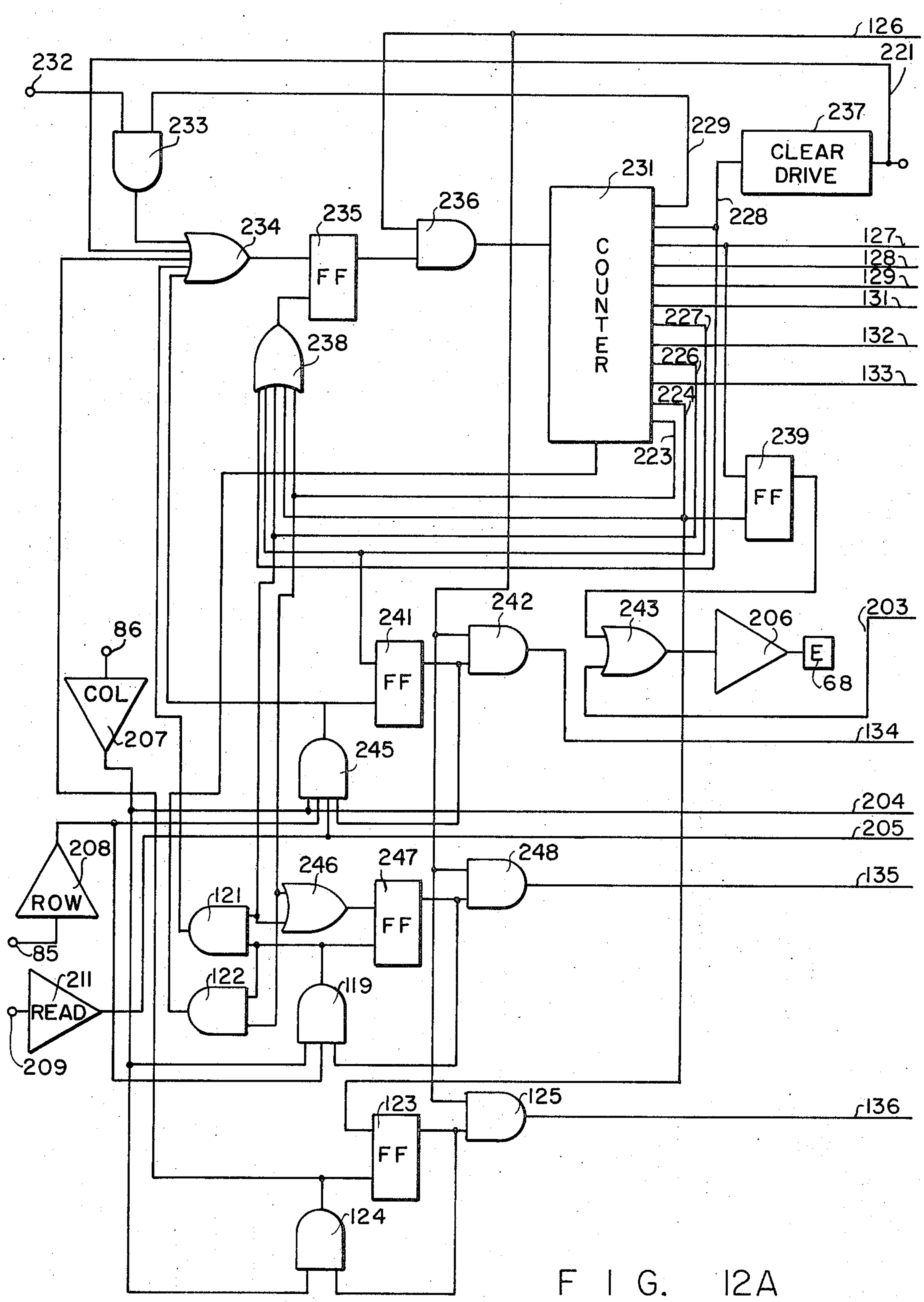
Figure 12B:
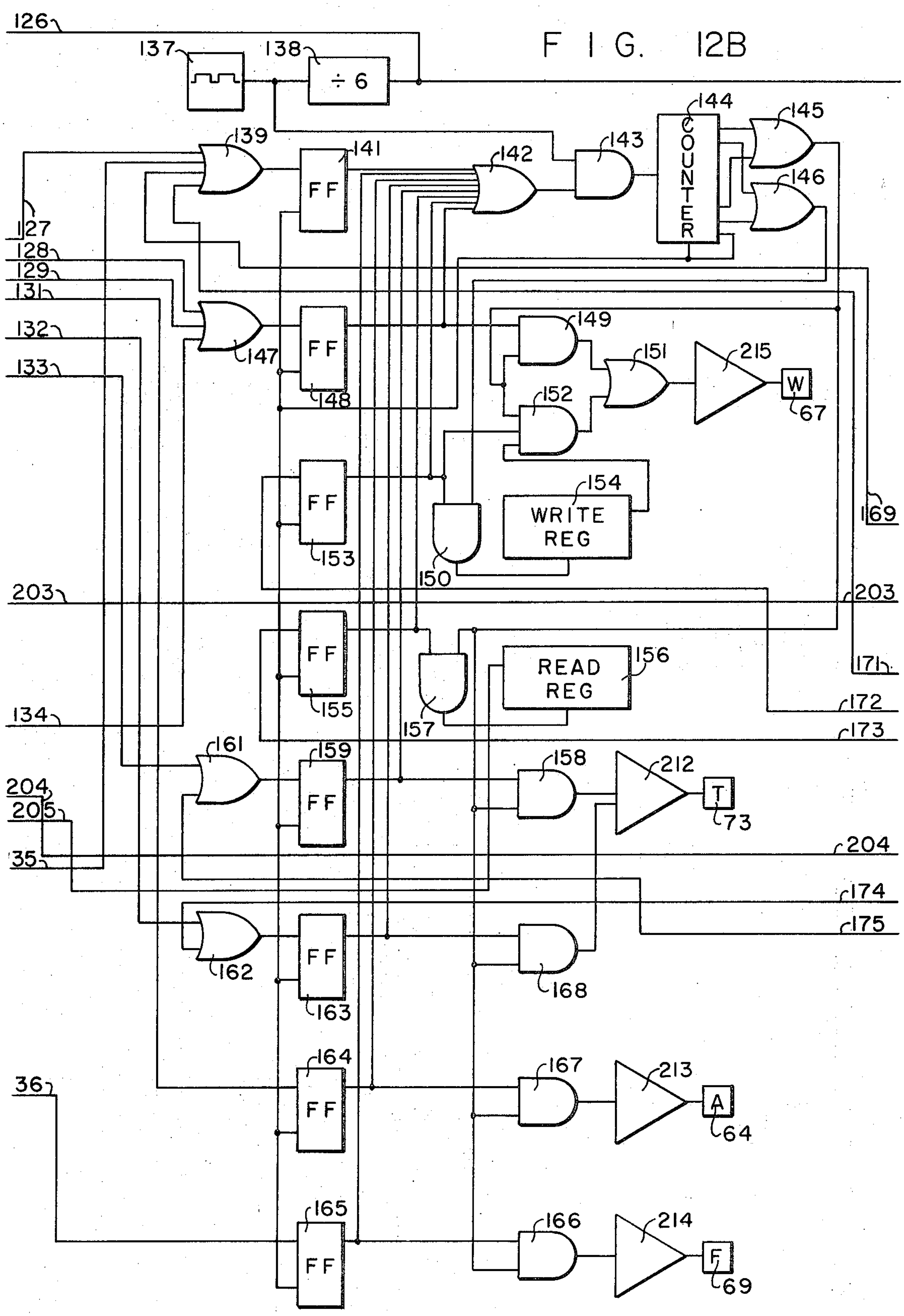
Figure 12C:
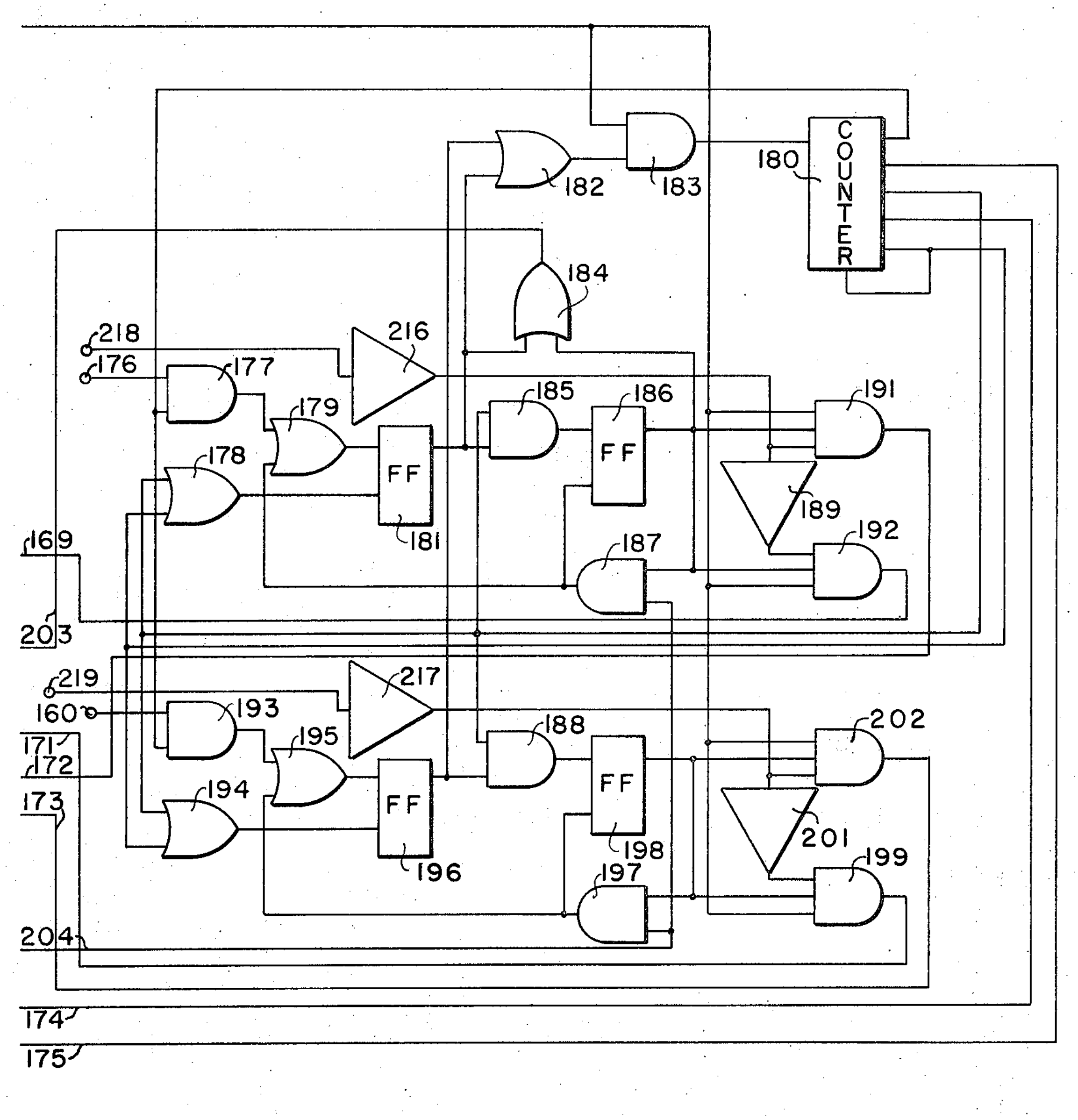

Other objects and advantages of this invention will become more apparent as the following description proceeds, which description should be considered together with the accompanying drawings in which:

FIG. 1 is a schematic sketch of one form of prior art magnetic storage device;

FIGS. 2, 3, and 4, are schematic sketches showing details of the device of FIG. 1;

FIG. 5 is a schematic plan view of a prior art thin film magnetic storage device;

FIGS. 6, 7, 8, 9, 10, and 11 are schematic plan views of a thin film magnetic storage device showing the method of determining flawed areas; and FIGS. 12A–12C comprise a logical block diagram of one form of apparatus which can cooperate with the storage device of FIGS. 6–11 to carry out this invention.

Referring now to the drawings in detail and more particularly to FIGS. 1, 2, 3, and 4, the reference character 11 designates a thin film of anisotropic magnetic material. A plurality of input heads 12 are connected to a source of input pulses 13 for inserting magnetic pulse information into the film 11. A control circuit 15 is connected to the source of input pulses 13, to a transverse field source 14, and to a source of bias field 18, as well as to a source of interrogating pulses 16 and to a utilization circuit 17. On the surface of the film 11 are ferromagnetic strips in the form of tripods 19 and separate bars 21. Magnetic bubbles are shown at 22. The bars and tripods 21 and 19 are arranged to define independent channels for the guidance of magnetic bubbles from the input heads 12 to output transducers 28. FIG. 2 shows the film 11 surrounded by two sets of coils 26 and 27 which are connected to the source of transverse field energy 14. FIG. 3 shows, in a somewhat larger size, the arrangement of the strips 19 and 21 to form tripods and bars.

In the operation of the apparatus shown in FIGS. 1–3, a pulse from the input pulse source 13 is applied to individual input heads 12. A bias field, which is perpendicular to the plane of the film 11, is applied to stabilize the magnetic bubbles 22. When an input head 12 receives a pulse from the source 13, a magnetic bubble is injected into the anisotropic film 11 adjacent the input head 12. The bubble quickly stabilizes its position adjacent the nearest ferromagnetic element 19 or 21. In the meantime, electrical signals from the field source 14 are applied to the coils 26 and 27. The arrows in FIG. 2 labeled ±HT indicate the directions of the magnetic fields generated by the signals in the coils 26 and 27. The final direction of the transverse magnetic field applied to the film 11 is the resultant of the two fields generated by the coils 26 and 27. By varying the time and amplitude relationships of the currents in coils 26 and 27 it is possible to cause the resultant transverse magnetic field direction to rotate through 360°. Such a rotation causes the magnetic bubbles to move through a single cycle or period of the tripod-bar pattern. The electrical signals applied to the system by the various sources 13, 14, 16, and 18 are synchronized by the control circuit 15 to apply the field signals to the coils 26 and 27 immediately after the input signals are applied to the heads 12 by the input source 13. This ensures that each input magnetic bubble injected into the film 11 is moved away from the input heads 12 before the next one is injected. Of course, the field signals in the coils 26 and 27 may be continuously applied alternating currents whose frequency is synchronized to the pulse input frequency of the input circuit 13. In this manner, a plurality of magnetic bubbles are injected into the film 11 in series to form digital words. Since a plurality of heads 12 are shown in FIG. 1, a plurality of words can be injected in parallel. For each of the heads 12, there is a separate information channel formed of the bars 21 and the tripods 19. As the signals are applied to the coils 26 and 27, the fields created by those coils apply magnetic forces to the individual bubbles to drive them through their channels. Although not obvious from FIG. 2, there are often a plurality of films 11 stacked together inside the common coils 26 and 27 so that the bubbles 22 are all driven at the same time in all of the films. This provides an additional capability for parallel word injection and manipulation with the digits injected into the individual films 11 forming parallel words.

The details of the bars 21 and tripods 19 are shown in FIG. 3. A modification of the channel magnetic spots is shown in FIG. 4 where the bubbles 22 are shown adjacent a portion of a channel marked by bars 25 and Ts 24 of magnetic material placed over the film 11. As in the case of the bars 21 and tripods 19 of FIG. 3, the bars 25 and Ts 24 of FIG. 4 define the information channels along which the bubbles 22 are driven. By providing local spots of decreased magnetic reluctance, the bars and Ts act as channel markers for the magnetic bubbles 22.

In FIG. 5, a storage chip 11 comprising a thin magnetic film is shown in schematic form having a plurality of minor storage loops 31, 32, 33, 34, 35, and 36 and a central transfer loop 37. The loops are diagramatically shown as channels with bubble locations depicted by circles. Coupling the transfer loop 37 to each of the storage loops 31–36 are individual transfer blocks 38. A sensor or read station 39 is located adjacent the transfer loop 37. A transfer block 41 couples the transfer loop 37 with an open loop connected to an annihilator 43, and another transfer block 42 applies information generated by a generator 44 to the transfer loop 37. The generator 44 is also connected by means of a direct path to an annihilator 45. The transfer of magnetic bubbles from the generator 44 to the transfer loop 37 is under the control of a write circuit 46. Similarly, the transfer of magnetic bubbles from the transfer loop 37 to the annihilator 43 is under the control of an erase circuit 47. The transfer of information from the transfer loop 37 to any or all of the storage loops 31–36 is under the control of a transfer circuit 48 which drives a transfer line 49. The line 49 is connected at one end to the transfer circuit 48, passes over all of the transfer blocks 38, and is grounded at the other end. The read sensor 39 is connected to an output or utilization device, not shown.

FIG. 5 shows in schematic form a typical prior art magnetic bubble memory device. The device comprises the chip 11 with a thin magnetic film arranged in a system such as that shown in FIGS. 1 and 2 with biasing means and magnetic driving coils. Although not shown in FIG. 5 to avoid unnecessary clutter on the drawings, the storage loops 31–36, the transfer loop 37, the path from the generator 44 to the annihilator 45, and the path from the transfer block 41 to the annihilator 43 are all defined by means of appropriately shaped magnetic elements arranged on the surface of the film 11 in a manner similar to those shown in FIGS. 3 and 4. For this discussion, the shape of these magnetic elements is immaterial, and any suitable shape may be used. The generator 44 is any source of magnetic bubbles and is driven by a source of clock pulses which is not shown in this figure. Each time a clock pulse energizes the generator 44, a magnetic bubble is formed. That bubble is maintained in a stable condition by the bias source for the entire chip 11. The coils 26 and 27 (shown in FIG. 2) are energized in a regular pattern to provide bubble driving forces in the film 11. Once a bubble is formed by the generator 44, the magnetic forces created by the driving coils 26 and 27 will cause the bubble to move from the generator 44 toward the annihilator 45 along the path defined by the magnetic elements. Once a bubble has been generated by the generator 44 and is driven away from the generator, another clock pulse causes the generator 44 to generate another bubble. In this manner, a steady stream of bubbles is generated by the generator 44 and is driven by the coils 26 and 27 around toward the annihilator 45. Periodically these bubbles will pass by the transfer block 42. When it is desired to provide the transfer loop 37 with a magnetic bubble, the write circuit 46 is energized causing a bubble to leave the path from the generator 44, move across the transfer block 42, and enter into the transfer loop 37. To assure synchronization of the system, the source of pulses for the write circuit 46 may originate in the same source of clock pulses which drives the generator 44. The memory in FIG. 5 shows six storage loops by way of example. This system will store digital words comprising six binary bits each. Each storage loop 31–36 must have exactly the same storage capacity as each of the other storage loops. As shown in FIG. 5, each loop can store ten binary bits. Thus, the memory shown in FIG. 5 can store ten words each of which comprises six digits. The words are constructed by the bubbles from the generator 44. As indicated above, the coils 26 and 27 operate together to drive the bubbles along their designated paths in the film 11. Since all of the paths are under the same influence of the coils 26 and 27, all of the bubbles are driven together. Each time a bubble is driven along the path from the generator 44 to the annihilator 45, the bubbles are also driven along the loop 37. In this manner, when a bubble is caused to traverse the transfer block 42 and enter the transfer loop 37, that bubble is moved along the loop 37 at the same time that a new bubble is brought across the transfer block 42 from the generator 44. The write circuit 46 determines the composition of the word in the transfer loop 37 by causing some bubbles to be transferred across the block 42 and other bubbles not to be so transferred. Assume that 6-bit times have passed and that the transfer loop 37 now contains the following digital word where a one represents the presence of a bubble in a bubble position and a zero denotes the absence of a bubble from such a position: 110011. This word is transferred around the loop 37 until the first digit is aligned with the transfer block 38 adjacent the storage loop 36. At that time, the transfer generator 48 is energized and current flowing through the line 39 causes the transfer of bubbles from the loop 37 to the storage loops 31–36. Then loops 31, 32, 35, and 36 contain bubbles and loops 33 and 34 do not. The coils 26 and 27 cause all of the bubbles in all of the loops to shift in the same way at the same time. As the bubbles in the transfer loop 37 pass over the transfer block 41, the erase circuit 47 is energized causing the bubbles to transfer from the loop 37 along the path to the annihilator 43 where they are destroyed. In this manner, the loop 37 is emptied and prepared for additional words supplied from the generator 44. Once the memory has been filled with words in this manner, the bubbles remain stored in the memory and are driven continually around the loops 31–36. When a particular word is to be read from the memory shown in FIG. 5, the transfer loop 49 is energized by the transfer circuit 48 with a pulse whose polarity is opposite to the write pulse. This causes the magnetic bubbles in the loops 31–38 which are adjacent the transfer bars 38 to move from the loops 31–36 to the transfer loop 37. Continued activity of the coils 26 and 27 drives these bubbles around the loop 37 and past the sensor head 39. At the sensor head 39, the individual bubbles are sensed and the information is read out. If that information is not to be destroyed, the bubbles continue on their path around the loop 37 until they reach their original positions over the transfer blocks 38 adjacent the loops 31–36 from which they were withdrawn. A write pulse is applied to the transfer circuit 48 and energizes the line 49 to cause these magnetic bubbles to return to the loops 31–36 in the same positions from which they were withdrawn. This operation, of course, requires a prescribed relationship between the size of the transfer loop 37 and the size of the storage loops 31–36. The transfer loop 37 may have a capacity which is any multiple of the capacity of the storage loops 31–36.

The system shown in FIG. 5 is an effective system for storing large quantities of digital information. Although the memroy is a serial memory in the sense that the words are circulating within the memory and access to any particular word can be had only when that word is adjacent the transfer block 38, the high-speed of circulation of the magnetic bubbles within the magnetic film 11 and the relatively small size of the storage loops 31–36 combine to produce a mass storage memory for digital information, which memory has a comparatively small access time and which requires very little power to operate. It is contemplated that the magnetic memory of the type described in FIGS. 1–5 have a capability of storing $10^6$ digits per square inch of magnetic film 11. At this time, the major drawback to reaching this storage capacity is due to defects in the magnetic film material 11.

The above description is drawn to the prior art and has been presented to provide a general overall picture of a magnetic bubble memory array. The general description above has ignored defects in the material and similar problems and is, therefore, a rather idealized description. FIGS. 6–11 are also schematic in nature, but they introduce a generalized defect in the thin magnetic film and illustrate the method by which this defect is bypassed in the operation of the memory. The reference characters in FIGS. 6–11 which refer to the same components remain the same throughout the figures. Since there is little difference in what is shown among the figures, the arrangement of FIG. 6 will be described in some detail and the FIGS. 7–11 will be discussed in reliance upon that detailed description. The apparatus shown in FIGS. 6–11 is basically the same as that shown in FIG. 5 and comprises, on a chip 51, a plurality of minor loops 52, 53, 54, 55, 56, 57, and 58 arranged around a transfer loop 61. A generalized defect 59 in the magnetic film on the chip 51 straddles two loops 55 and 56. This is a major difference between the apparatus of FIG. 6 and that of FIG. 5. A transfer line 63 driven by a transfer generator circuit or terminal 73 straddles transfer blocks 62 which are adjacent each of the loops 52–58. In addition to the information loops 52–58, there is a row marker loop 78, a column marker loop 79 and a control loop 76. Loops 79 and 76 are each larger than the information loops 52–58, and loops 78 and 79 communicate with loop 61 through transfer blocks 60 which are controlled by a transfer generator or terminal 64 through line 70. Loop 76 communicates with loop 61 through transfer block 72 which is controlled by transfer generator or terminal 69. A bubble generator 65 generates magnetic bubbles and supplies them to a transfer block 71 which is under the control of a write control circuit or terminal 67. Those bubbles generated by the generator 65 which are not transferred to the transfer loop 61 across the transfer block 71 are destroyed in an annihilator 66 to which the generator 65 is connected by a magnetic channel. A write control circuit 67 is connected to the transfer block 71 causing the transfer of bubbles from the generator 65 to the transfer loop 61. The information contained in the transfer loop 61 can be read out by means of a read head 74. Although not shown in FIG. 6, the read head 74 is connected to an output or utilization circuit through a terminal 209. An erase control circuit head or terminal 68 controls the transfer of bubbles from the transfer loop 61 across a transfer block 87 to an annihilator 88. In all of the loops shown in FIG. 6 and other pieces of the apparatus, the locations at which magnetic bubbles can be stored are shown by small circles 82. In this description, those circles 82 which are empty designate bubble positions which do not contain bubbles. When a black, or filled-in, circle 82 is shown, it indicates that a bubble is present at that position. A row read head 84 is adjacent a row marker loop 78 and is controlled by a pulse coupled to an input terminal 85. Likewise, a column read head 83 is adjacent a column loop 79 and is connected to an input terminal 86. The control loop 76 has a control read head 75 and a control write head 77 adjacent it. Having described the basic organization of the sample memory chip 51, the method and apparatus for detecting defects in the magnetic material and avoiding such defects will be described.

Figure 6:
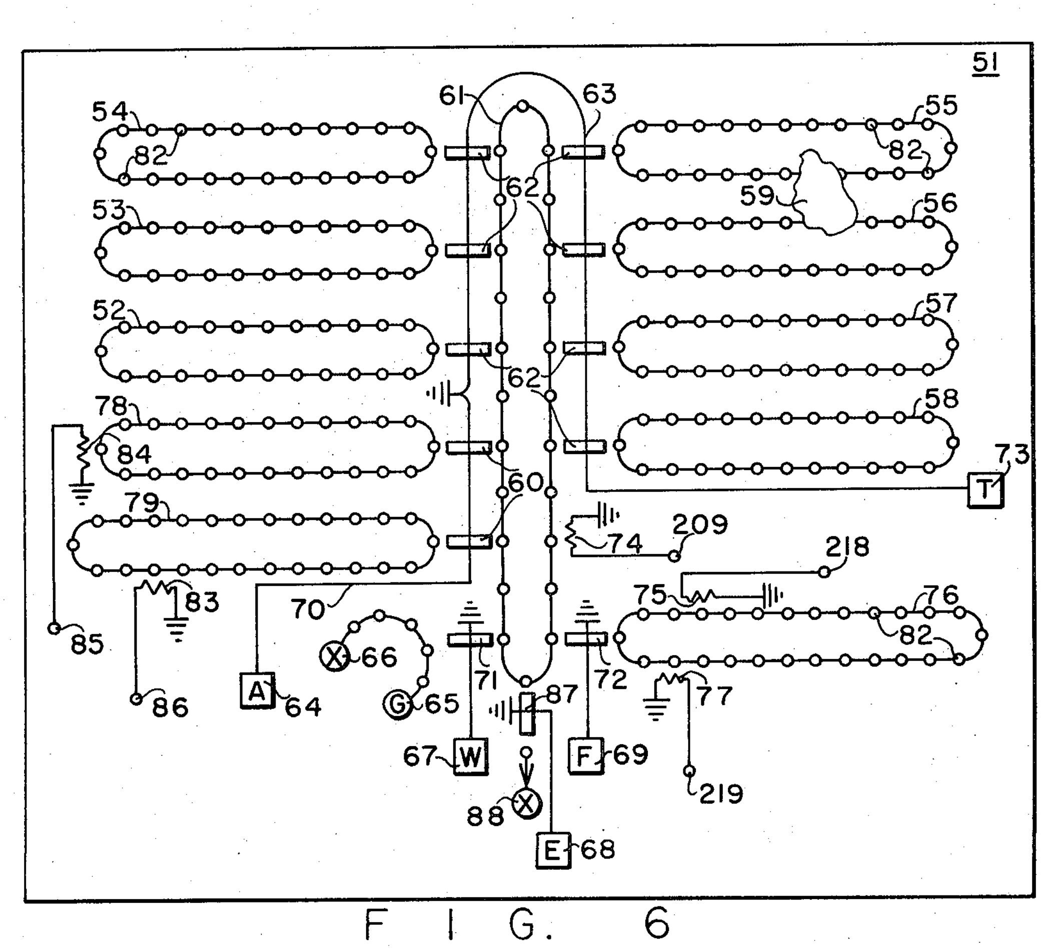

FIG. 6 shows a basic apparatus without the presence of any magnetic bubbles. This is fine for discussing the manner in which each of the elements of the apparatus works. As in the equipment described in FIGS. 1–5, the chip 51 comprises a suitable base having a very thin layer of anisotropic magnetic material deposited thereon. The manner in which the magnetic layer is attached to the base is immaterial to this discussion as are the specific compositions of both the base layer and the thin magnetic film. As in the apparatus described above, the channels through which magnetic bubbles are to be moved are defined on the chip 51 by small particles of ferromagnetic material. These particles may be in the form of the Ts and bars shown in FIG. 4 or any other suitable form developed for this purpose. The particles are located on the surface of the magnetic film so that they form the desired paths along which the magnetic bubbles will move, and the paths are, for example, the loops 52–58, 76, 78, and 79, and the paths between the generator 65 and the annihilator 66, and between the transfer block 87 and the annihilator 88. Appropriate electrical signals are applied to the bubble generator 65 which generates magnetic bubbles. These signals usually originate in a clock or, more descriptively, in a clock pulse generator. The chip 51 is surrounded as shown in FIG. 2, with coils such as the coils 26 and 27 for driving the magnetic bubbles through the film. As mentioned above in FIGS. 1–5, the clock which supplies pulses to the generator 65 is synchronized with the source of energy which supplies signals for the transverse field coils which drives the bubbles. In this manner, a pulse applied to the generator 65 generates a magnetic bubble, and the source which supplies the transfer driving coils moves the bubble away from the generator 65. A bubble path is defined by the magnetic particles located on the surface of the film from the generator 65 to the annihilator 66 and passing by the transfer block 71. Pulses are applied to the write circuit 67 which transmits these pulses along a line traversing the transfer block 71 to ground. The write pulses are synchronized with the generating pulses which are applied to the generator 65. A signal applied to the write control circuit 67 at the time that a bubble in the path between the generator 65 and the annihilator 66 is adjacent the transfer block 71 will cause that bubble to move across the transfer block 71 into the transfer loop 61. Thus, the signal applied to the write control circuit 67 takes the bubbles generated by the generator 65 and puts them into the transfer loop 61. The same field signals which cause the bubbles to move away from the generator 65 also cause the bubbles to move around the loop 61 and away from the transfer block 71. Those bubbles which are generated by the generator 65 and which are not transferred across the transfer block 71 because no corresponding signal was applied to the write control circuit 67, move on to the annihilator 66 where they are destroyed. In the manner described above, magnetic bubbles are generated and, under appropriate control, are introduced into the transfer loop 61 on a regular, timed basis. As mentioned, the bubbles in the loop 61 are caused to move around the loop by the same driving fields which cause the bubbles to move away from the generator 65. At an appropriate time when a full word of information has been inserted into the loop 61, a signal applied to the transfer circuit 73 sends a signal to all of the transfer blocks 62 to cause all of the bubbles in the loop 61 adjacent to the transfer blocks 62 to move across the transfer blocks 62 into the loops 52–58. Because of the geometry of this system, only every other bubble is transferred at any time. The bubbles may be shifted one bubble position, and then a second signal in transfer circuit 73 causes the remainder of the data bubbles to move into loops 52–58. Thus, the information is inserted into the information storage loops in sequence. Assume now that information has been applied to the information storage loops 52–58 and a particular word is to be read out of these loops. For this discussion, a word will be considered information stored in a single bubble position in each of the storage loops 52–58 simultaneously. Thus, at any time, when the appropriate signal is applied to the transfer control circuit 73 in a direction to cause the magnetic bubbles to move from the storage loops 52–58 across the transfer heads 62 into the transfer loop 61, the transfer of a single bit of information from each of the storage loops 52–58 makes up a word in the transfer loop 61. As the information is caused to move through the loop 61, it passes by the read head 74 where it is detected. Typically, the read head or sensor consists of a tiny length of very thin Permalloy metal, the electrical resistance of which is high when a bubble is nearby and low when no bubble is present. Information read out of the storage loops 52–58 can be read from the system by means of the read head 74. Should that information need to be erased, then the erase control circuit 68 is energized each time a bubble appears adjacent the transfer block 87. This causes that bubble in the loop 61 to move across the transfer block 87 and into the path of the annihilator 88 where it is destroyed. By appropriate manipulation of the erase head 68, individual pulses stored temporarily in the transfer loop 61 can be eliminated. This has described the typical operation of a fault-free, thin film, magnetic memory. But what happens when there are faults in that magnetic memory?

Figure 7:
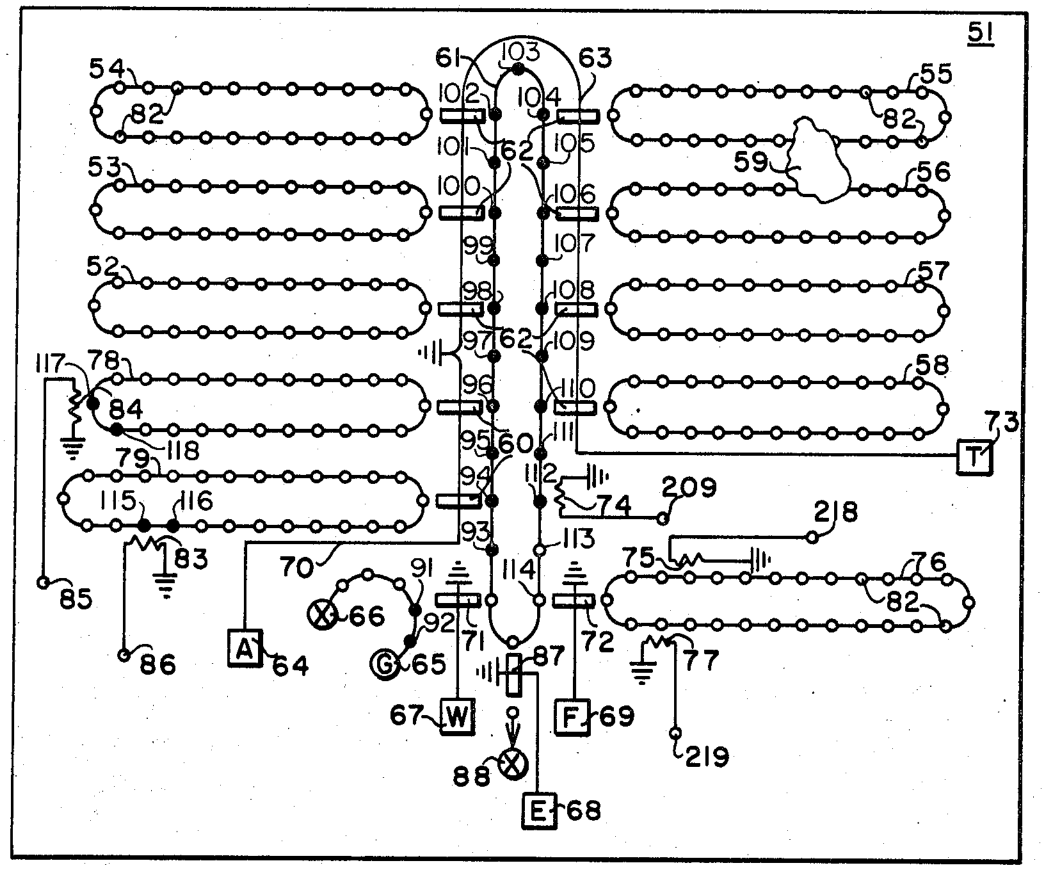
Figure 8:
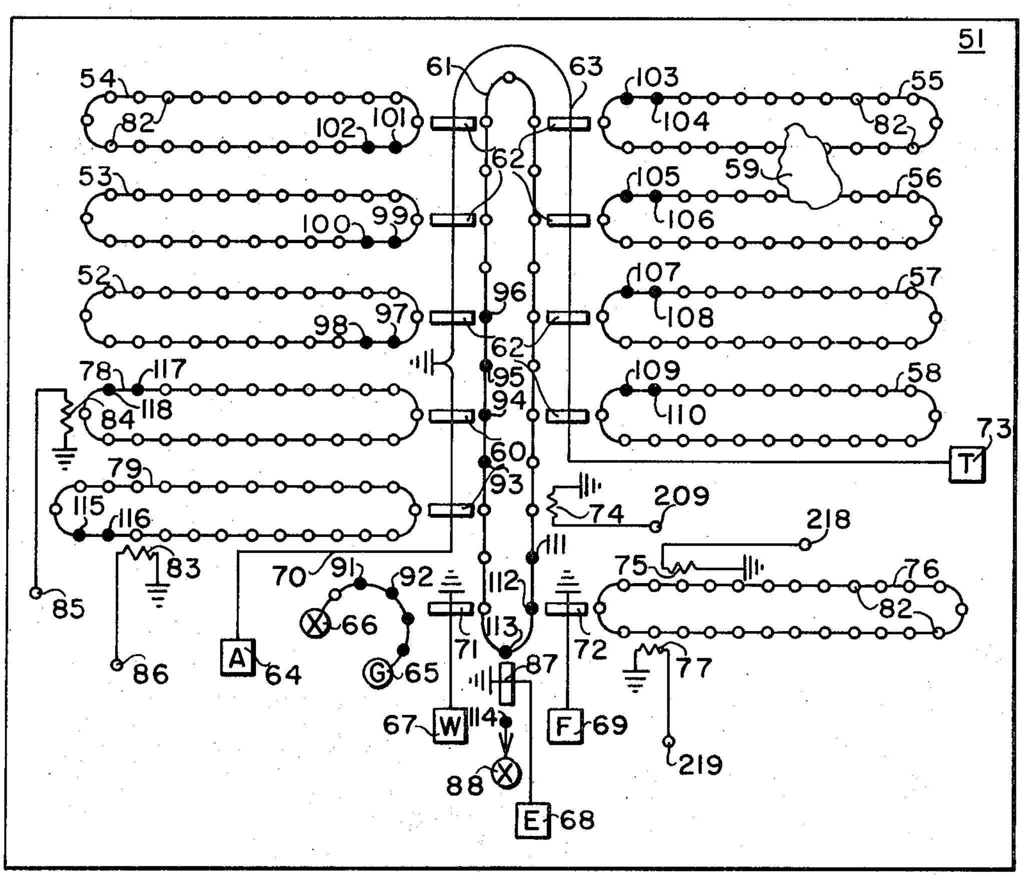

In FIG. 7 a pair of magnetic bubbles 91 and 92 have just been generated by the generator 65. Bubble 91 is just now adjacent the transfer block 71 and bubble 92 has just emerged from generator 65. The loop 61 has almost been filled by bubbles 93, 94, 95, 96, 97, 98, 99, 100, 101, 102, 103, 104, 105, 106, 107, 108, 109, 110, 111, 112, 113, and 114, but at this point there is an empty bubble position adjacent the transfer block 71. At the time the next write signal appears at the write circuit 67, the bubble 91 will be transferred into the empty spot in loop 61, and, on the next cycle, the bubble 92 will be similarly transferred if a write signal also occurred on the next cycle. In addition to the bubbles 91 and 92, which were just generated, and the bubbles 93–114, which are in the loop 61, the row loop 78 contains two bubbles 117 and 118 and the column loop 79 contains two bubbles 115 and 116. Thus, prior to the time shown frozen in FIG. 7 the bubble generator 65 had generated the bubbles 91–114, and the bubbles 93–114 had been transferred, one-by-one, into the transfer loop 61. Before this took place, however, the four bubbles 115, 116, 117, and 118, in a separate operation, had been generated by the generator 65, transferred into the transfer loop 61, and then had been transferred into the two loops 78 and 79 with two of the bubbles in each loop. Then, the filling of the loop 61 was begun. When the loop 61 is completely filled with bubbles, the transfer circuit 73 will be energized, and the bubbles which are adjacent the transfer blocks 62 will be transferred into the loops 52–58. This will result in bubble 98 being transferred into the loop 52, bubble 100 being transferred into the loop 53, bubble 102 into the loop 54, bubble 104 into the loop 55, bubble 106 into the loop 56, bubble 108 into the loop 57, and bubble 110 into the loop 58. Immediately after the transfer of these bubbles, the drive circuits move all of the bubbles one bubble position in a clock-wise direction. A second energization of the transfer circuit 73 results in the transfer of bubble 97 into the loop 52, bubble 99 into the loop 53, bubble 101 into the loop 54, bubble 103 into the loop 55, bubble 105 into the loop 56, bubble 107 into the loop 57, and bubble 109 into the loop 58. After another bubble shift in a clock-wise direction, the memory chip 51 appears as shown in FIG. 8. Left in the loop 61 are bubbles 93–96 and 111—113. Once the transfer of bubbles from the loop 61 into the loops 52–58 began, no more bubbles were transferred from the generator 65 into the transfer loop 61. Therefore, bubbles 91 and 92 are well on their way to the annihilator 66 where they will be destroyed. As the situation now stands in FIG. 8, each of the loops 52–58, 78, and 79 contain two bubbles. Bubble 114 is missing from the loop 61 in FIG. 8. It had reached the transfer block 87, the erase circuit 68 was energized, and bubble 114 is shown on its way to being destroyed in the annihilator 88. As the drive circuits continue to operate, all of the bubbles will be driven in a clock-wise direction, and those remaining in loop 61 gradually will be erased in the same manner as bubble 114.

Figure 9:
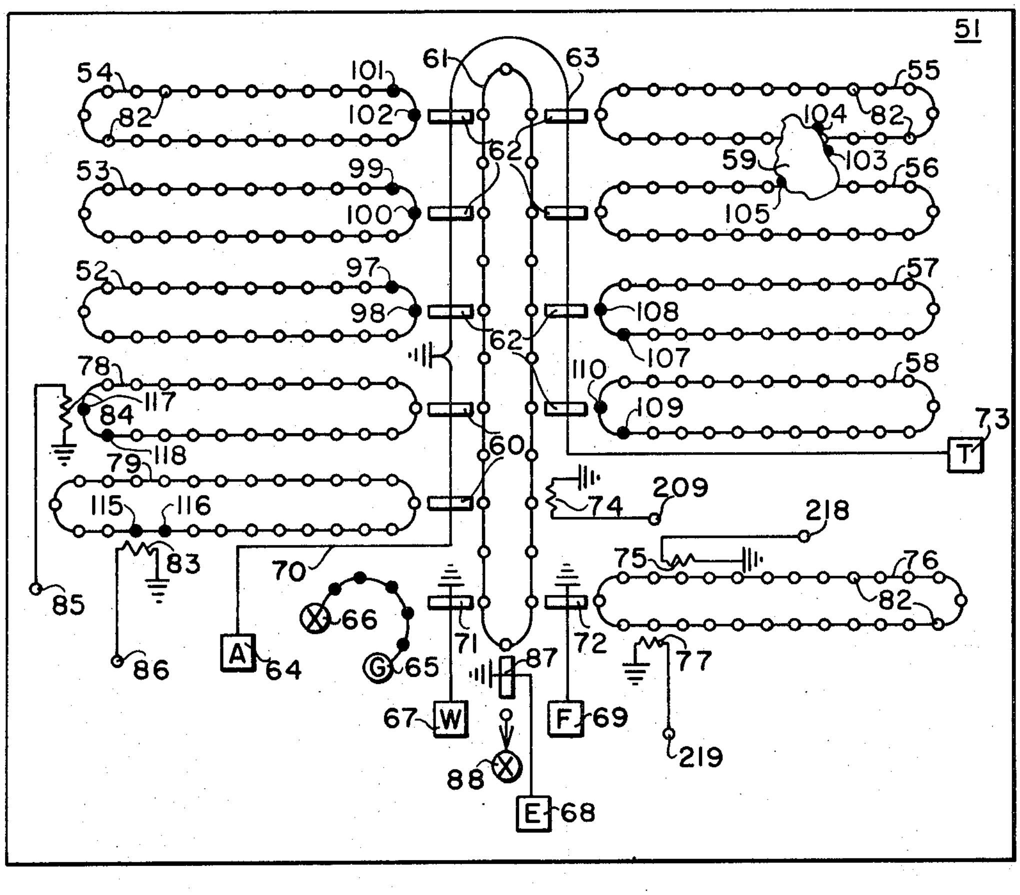

The information in the chip 51 is driven in a clock-wise direction until the bubbles in the loops 52–58 have made many complete circuits and bubbles 117 and 115 have come opposite read heads 84 and 83, respectively. In the meantime, the information which had remained in the loop 61 has been cleared. This is the situation which is now shown in FIG. 9. The situation frozen in FIG. 9 shows bubbles 98, 100, 102, 108, and 110 adjacent their respective transfer blocks 62, and bubbles 97, 99, 101, 107, and 109 one space removed from their respective transfer blocks 62. No bubbles are shown adjacent the transfer blocks from the loops 55 and 56 because they have become entangled in the defect 59 which straddles those two loops. Because of the defect 59, no information inserted into the loops 55 and 56 will ever make a complete circuit and be returned to the transfer loop 61. At this point, the transfer circuit 73 is energized to transfer information out of the loops 52–58 and into the transfer loop 61. Bubbles 98, 100, 102, 108, and 110 are first transferred into the loop 61. The bubbles are then driven one bubble space in a clock-wise direction. The transfer circuit 73 is again energized, and now bubbles 97, 99, 101, 107, and 109 are transferred into the loop 61 immediately adjacent their evennumbered partners. That is the situation which is shown in FIG. 10. As the bubbles 97–102 and 107–110 reach the transfer block 72, the transfer control circuit generator or fault store terminal 69 is energized and these bubbles are trasnferred, one at a time, from the loop 61 into the control loop 76. When that operation has been completed, the transfer loop 61 is empty, information loops 52, 53, 54, 57, and 58 are empty, some of the bubbles in loop 55 and 56 are hung up at the defect 59, bubbles are in the loop 76 in a first group of four (107–110) and a second group of six (97–102), and the bubbles 115–117 will be found in the locations shown in the loops 78 and 79. This is the situation that is shown in FIG. 11. FIG. 11 shows the chip 51 in condition to receive operating information. The information which is presently stored in the control loop 76; namely, the bubbles 97–102 and the bubbles 107–110 will serve to control the transfer of information into the loop 61 so that no information will be transferred therefrom into loops 55 and 56. This will avoid the defect 59. Similarly, on reading out information from the chip 51, bubbles 97–102 and 107–110, when detected at control read head 75, signify the presence of information at read head 74, which information was stored only in the good loops 52–54, 57 and 58, and no information which was stored in loops 55 and 56.

The row and column loops 78 and 79, respectively, have been mentioned only briefly above. In order to recover any particular word from memory, the zero or index position of each loop must be known. Identification of the zero position of each loop and of the digit positions within the loops is the function of the two loops 78 and 79 operating together. Loop 78 is exactly the same size as each of the minor loops 52–58, but loop 79 is two bubble positions larger, being equal in length to loop 76. The geometry of the loops as shown in FIG. 6 is such that bubbles are transferred in pairs. At any time, only every other bubble present in the transfer loop 61 can be transferred into the loops 52–58, 78, and 79. In order to transfer all of the contents of the transfer loop 61, those bubbles adjacent the storage loops 52–58 are transferred, the information in all of the loops is stepped one space, and then the bubbles remaining in the loop 61 are transferred into the loops 52–58. Thus, each step or operation is performed in pairs. For this reason, each of the loops is shown with pairs of bubbles. Assuming, as was done above, that the information in the entire chip 51 is rotated clockwise in synchronism within each loop, and that, when information was transferred from the loop 61 into the storage loops 52–58 as shown in FIG. 7, the two bubbles 117 and 118 in the loop 78 were adjacent the read head 84, then whenever the information in the storage loops 52–58 makes a complete cycle, so do the bubbles in the loop 78. The operation of the system is such that transfers of information to or from the transfer loop 61 take place when the bubbles 115 and 116 in the loop 79 are adjacent the reading head 83. This will be explained in detail below. The positions of the bubbles in the row marker loop 78 with respect to the sensor head 84 represents the positions of the bubbles in the individual information loops 52–58 with respect to the loop 61. In a similar manner, the bubble positions in the column marker loop 79 with respect to the sensing head 83 represent the bubble posi-tions in the transfer loop 61 with respect to the sensing head 74. When transferring information into an out of the memory, it is important to know not only that the individual information loops 52-58 are at a zero or index position, but also, that the transfer loop 61 is at the zero position.

The presence of bubbles 117 and 115 or 118 and 116 opposite reading heads 84 and 83 respectively signifies the time at which the very first bits of information may be entered into the chip 51 via loop 61. Thereafter the accumulation of a full word of information within loop 61 will be signified by the reappearance of bubbles 115 and 116 opposite read head 83, at which times the words will be transferred into the storage loops 52–58, clearing loop 61 to receive additional information. This process may continue until bubbles 117 and 115 again appear simultaneously at read heads 84 and 83, respectively; signifying that the storage loops 52–58 have been completely filled with information.

Reading information out of the chip 51 similarly begins by transferring a word from the loops 52–58 into loop 61 and subsequently detecting the information at read head 74 as the loops are all circulated. During the readout of loop 61, if it is desired to clear the information from chip 51, a signal from erase circuit 68 at each transfer time serves to annihilate the bubbles in loop 61 after thay have been read. By omitting the erase signals at circuit 68 it is possible to restore the information just read from loop 61 back into loops 52–58 by causing an appropriate transfer signal out of circuit 73 after the information has been circulated through the complete information loop cycle. Note that loop 61 is of the same length as loops 52–58; thus, after a complete revolution of the set, any information previously transferred into loop 61 may be transferred back into its original location within loops 52–58.

It should be noted that only one embodiment of the subject invention has been described, and variations will be evident to those skilled in the art. For example, it is not necessary to employ a separate write circuit 64 to set the address marks into loops 78 and 79. This function may be performed by extending line 63 to include transfer block 60. Such a configuration would result in a slight simplification of the chip 51 at the expense of a slightly more complicated logical system for initially loading marks into the loops 78, 79, and 76. Likewise, if slight changes in the control logic are made, an equally useful memory system results by choosing the loops 76 and 79 to be two positions shorter than all the other loops. The important point here being that the lengths of loops 76 and 79 must be equal to each other and not quite equal to the lengths of loops 52–58 and 61. In particular, one half the length of loop 79 must have a number of bubble positions which is a prime number relative to one half the number of positions in loop 52. If improvements in the geometry of bubble loops should make it possible to position loops 52–58 opposite adjacent positions on loop 61 rather than opposite alternate positions as shown here, then the number of bubble positions in the whole length of loop 79 simply must be prime relative to the number of bubble positions in the whole lenth of 52.

The description of FIGS. 1–11 has explained the method of isolating the faults in accordance with this invention. The method was explained in conjunction with sketches of an idealized memory chip 51. FIGS. 12A, 12B, and 12C illustrate in block form some of the structure which can perform the method described above. In FIGS. 12A, 12B, and 12C, the reference character 232 designates an input terminal which is adapted to be connected to an output from a computer or other control source. The terminal 232 is connected to one input of an AND gate 233 whose other input is connected to the zero output of a 4-place binary counter 231. The counter 231 includes decoding circuitry so that the individual counts of the counter 231 energize individual output lines such as lines 223, 224, 226, 227, 228, 229, 132, and 133. The output of gate 233 is connected as one input to an OR gate 234, the output of which is applied to the set input of a flip-flop 235, whose set output applies an input to an AND gate 236. The output of the gate 236 is applied to the stepping input of the counter 231. The second input to the gate 236 is the line 126 which is connected to the output of a divide by 6 or modulo 6 counter 138 (FIG. 12B). The stepping input of the counter 138 is connected to the output of a clock pulse generator 137. The one count output from the counter 231 is applied to a line 228 which is connected to a chip clearing driver 237 and as one input to an OR gate 238. The output of the OR gate 238 is applied to the restore input of the flip-flop 235. The two count output of the counter 231 is applied to the line 127 which is connected to the set input of a flip-flop 239 and also to one input of an OR gate 139, the output of which is applied to the set input of a flip-flop 141. The three count output of the counter 231 is applied to the line 128 which is connected as one input to an OR gate 147, the output of which is applied to the set input of a flip-flop 148. The four count output from the counter 231 is applied to a line 129 which is connected to a second input of the OR gate 147. The five count output of the counter 231 is applied to a line 131 which is connected to the set input of a flip-flop 164. The six count output of the counter 231 is applied to a line 227 which is connected to another input of the gate 238 and to the set input of a flip-flop 241. The seven count output of the counter 231 is applied to a line 132 which is connected to one input of an OR gate 162 whose output is applied as the set input to a flip-flop 163. The eight count output from the counter 231 is applied to a line 226 which is connected to another input of the gate 238, to one input of an OR gate 246 whose output is applied as the set input of a flip-flop 247, and to an input of an AND gate 121 whose output is applied as another input to the gate 234. The nine count output of the counter 231 is applied to a line 133 which is connected as one input to an OR gate 161 whose output is applied to the set input of a flip-flop 159. The ten count output of the counter 231 is applied to a line 224 which is connected to another input of the gate 238, the restore input of the flip-flop 239, and the set input of a flip-flop 123. The eleven count output of the counter 231 is applied to a line 223 which is connected to another input of the gate 238, as the second input to the gate 246, and as one input to an AND gate 122 whose output is applied as the reset input to the counter 231. The set output of the flip-flop 239 is applied as one input to an OR gate 243 whose output is connected to the erase driver 206, the output of which is connected to terminal 68 of the apparatus of FIG. 6. The line 126 from the output of the modulo 6 counter 138 is also connected to one input of an AND gate 242 whose output is applied to a line 134 which is connected to a third input of the gate 147. The line 126 is also connected to one input of an AND gate 248, whose output is applied to a line 135 which is connected to another input of a gate 139, and to an input of an AND gate 125, whose output is applied to a line 136 which is connected to the set input of a flip-flop 165. The set output of the flip-flop 241 is connected to the second input of an AND gate 242 and also to one input of an AND gate 245 whose output is applied to the restore input of the flip-flop 241 and to another input to the gate 234. The set output of the flip-flop 123 is applied to the other input of the gate 125 and as one input to an AND gate 124 whose output is connected to the restore input of the flip-flop 123 and to another input of the gate 234. A terminal 86 is connected to the column read sensor 83 on FIG. 6 and is also connected to column mark sense amplifier 207 whose output is connected to one input of the gate 245, one input to an AND gate 119 whose output is connected to the restore input of the flip-flop 247, and to the second inputs of the gates 121 and 122, to the second input of gate 124, and to a line 204 which is connected to one input of an AND gate 197 and to one input of an AND gate 187 (FIG. 12C). The row mark terminal 85 is the same as the row mark terminal 85 on the chip 51 on FIG. 6 and is connected to row mark sense amplifier 208 whose output is connected to an input of the gate 245 and to an input of the gate 119. The read output terminal 209 is connected to the read out head 74 on FIG. 6 and to read out sense amplifier 211 whose output is connected to an input of the gate 245 and through line 205 to the input of a read register 156. The set output of the flip-flop 247 is connected to another input of the gate 248 and to another input of the gate 119. The second input to the gate 243 is from a line 203 which is connected to the output of an OR gate 184 (FIG. 12C). A signal indicating the completion of chip clearing is generated by chip clearing driver 237 and is applied as another input to gate 234 through line 221.

The output of the clock pulse generator 137 (FIG. 12B) is also applied to an input of an AND gate 143 whose output is applied to the stepping input of a five place counter 144. The one output of the counter 144 is connected to an input of an OR gate 145 whose output is applied to an input of an AND gate 157 whose output is applied as the shift input of the read register 156, to one input of an AND gate 158 whose output is applied to the transfer output terminal of transfer I/O driver 212 the output of which is connected to terminal 73 on the chip 51, to one input of an AND gate 168 whose output is connected to the transfer input terminal 73 of transfer I/O driver 212, to an input of an AND gate 167 whose output is connected to the set address mark driver 213 whose output is connected to the address mark terminal 64 on the chip 51, and to one input of an AND gate 166 whose output is applied to the store fault driver 214 whose output is connected to the fault store terminal 69 on the chip 51. The two count output from the counter 144 is applied as one input to an OR gate 146 whose output is connected to one input of an AND gate 150, the output of which is applied as a shift input to a write register 154. The three count output of the counter 144 is applied to the second input of the gate 145. The four count output of the counter 144 is applied to the second input of the gate 146. The five count output from the counter 144 is applied as a reset signal to the counter 144, and to the restore inputs of the flip-flops 141, 148, 153, 155, 159, 163, 164, and 165. The set output of the flip-flop 141 is applied as one input to an OR gate 142 whose output supplies the second input to the gate 143. The set output of the flip-flop 148 is applied as another input to the gate 142 and as one input to an AND gate 149 whose output is applied as one input to an OR gate 151. The output of the OR gate 151 is connected to the write driver 215 whose output is connected to the write terminal 67 on the chip 51. The set output of the flip-flop 153 is applied as another input to the gate 142, as the second input to the gate 150, and as one input to an AND gate 152 whose output is applied as the second input to the gate 151. The output of the gate 145 is applied as a second input to the gate 149 and as another input to the gate 152. The output of the write register 154 is applied as the third input to the gate 152. The set output of the flip-flop 155 is applied as another input to the gate 142 and as the second input to the gate 157. The set output of the flip-flop 159 is applied as another input to the gate 142 and as the second input to the gate 158. The set output of the flip-flop 163 is applied as another input to the gate 142 and as the second input to the gate 168. The set output of the flip-flop 164 is connected as another input to the gate 142 and as a second input to the gate 167. The set output of the flip-flop 165 is connected as another input to the gate 142 and as the second input to the gate 166. The restore outputs from the flip-flops 141, 148, 153, 155, 159, 163, 164, and 165 are not used. The output of the clock counter 138 is also connected to one input of an AND gate 143 whose output is applied as the stepping input to a counter 180. The output of the modulo 6 counter 138 is applied to one input of an AND gate 191 whose output is connected to a line 172, to one input of an AND gate 192 whose output is connected to a line 169, to one input of an AND gate 202 whose output is connected to a line 173, and as one input to an AND gate 199 whose output is connected to a line 171. The line 169 is connected as another input to the gate 139 as is the line 171. The line 172 is connected to the set input of the flip-flop 153. The line 173 is connected as the set input to the flip-flop 155. The counter 180 is a four place counter whose zero count output is connected as one input to an AND gate 177 the output of which is applied as one input to an OR gate 179, and to one input of an AND gate 193 whose output is connected to one input of an OR gate 195. The output of the gate 179 is connected as the set input of the flip-flop 181, and the output of the gate 195 is connected as the set input of a flip-flop 196. The one count output of the counter 180 is connected to a line 175 which is connected as a second input to the gate 161. The two count output from the counter 180 is connected as an input to an AND gate 185 whose output is applied as the set input to a flip-flop 186, as an input to an AND gate 188 whose output is applied as the set input to a flip-flop 198, as another input to the gate 178 whose output is connected to the restore input of a flip-flop 181, and as one input to an OR gate 194 whose output is the restore input to the flip-flop 196. The three count output from the counter 180 is connected to a line 174 which is connected to the other input of the gate 162. The four count output of the counter 180 is connected as the reset input to the counter 180 and also as a second input to each of the gates 178 and 194. The set output from the flip-flop 181 is applied as one input to an OR gate 182 whose output supplies the second input to the gate 183, as one input to the OR gate 184, and as the second input to the gate 185. The set output of the flip-flop 196 is connected as the second input to the gate 182 and as the second input to the gate 188. The output from the gate 197 is applied as the restore input to the flip-flop 198 and also as the second input to the gate 195. The set output of the flip-flop 198 is applied as the second input to the gate 197, as the second input to the gate 199, and as another input to the gate 202. The set output of the flip-flop 186 is connected as the second input to the gate 184, as another input to the gate 191, as another input to the gate 192, and as the second input to the gate 187 whose output is applied as the second input to the gate 179 and as the restore input to the flip-flop 186. The write control terminal 218 is connected to the write control head 75 on the chip 51, to the input of write control sense amplifier 216 whose output is connected to another input of the gate 191 and, through an inverter 189, to another input of the gate 192. A write input terminal 176, adapted to be connected to a computer output, not shown, is connected as another input to the gate 177. A read control terminal 219 is connected to the read control head 77 on the chip 51 and also to the input of read control sense amplifier 217 whose output is connected to an input to the gate 202 and through the inverter 201 as an input to the gate 199. A read terminal 160 is adapted to be connected to a computer output, not shown, and is connected as one input to the gate 193.

As mentioned above, the transfer of bubbles in the type of bubble memory shown in FIGS. 5–11 is accomplished in pairs because of the way in which the loops are arranged. This means that for each operation two shifts are required. Put another way, it means that every step is duplicated. To prepare the chips 51 for operation, eleven steps are necessary, and to provide these eleven steps, the counter 231 is used. Preparing the chip in the sense used in this description is the identification and segregation of flaws in the chip 51 so that the loops containing these flaws are not used when information is later written into the memory. The eleven steps used to prepare the chip 51 are as follows:

TABLE 1. PREPARATION PROGRAM

| Step | Instruction |
|---|---|
| 1 | Clear |
| 2 | Rotate shift all loops, twice |
| 3 | Write and rotate shift twice |
| 4 | Write and rotate shift, twice |
| 5 | Set address marks and rotate shift, twice |
| 6 | Write and rotate shift, twice, and repeat until CM·RM·RO = 1 |
| 7 | Transfer in and rotate shift, twice |
| 8 | Rotate shift all loops, twice, and repeat until CM·RM = 1 |
| 9 | Transfer out and rotate shift, twice |
| 10 | Store faults and rotate shift, twice, and repeat until CM = 1 |
| 11 | Rotate shift all loops, twice, and repeat until CM·RM = 1 |

The counter 231 is the program counter-the counter which controls the orderly sequencing of the preparation program from one step to the next. In its zero condition, the counter 231 is quiescent. In addition to the zero condition, counter 231 has eleven output conditions, and each of the output conditions corresponds to one of the program steps listed above in Table 1. When the counter 231 is in the "one" condition, preparation program step 1 is performed; when the counter 231 is in its "two" condition, the second preparation program step is executed; and so forth. In addition to the preparation program, there are also a write program and a read program, each of which comprises three program steps. These programs appear in Table 2, and the steps are numbered 12–17 for identification purposes.

TABLE 2. WRITE AND READ PROGRAMS

| Step | Instruction |
|---|---|
| | Write Program |
| 12 | Transfer out and rotate shift, twice |
| 13 | Write and rotate shift, twice, and repeat until CM = 1 |
| 14 | Transfer in and rotate shift, twice |
| | Read Program |
| 15 | Transfer out and rotate shift, twice |
| 16 | Read out and rotate shift, twice, and repeat until CM = 1 |
| 17 | Transfer in and rotate shift, twice |

The details of operation of all of the program steps are controlled by the output from the counter 144 which has five count conditions. In condition zero, the counter 144 is quiescent. The count five condition is of momentary duration and is used to clear the operating circuits. Count conditions 1–4 of the counter 144 control the operational details with step 3 repeating the operation of step 1 and step 4 repeating the operation of step 2. In steps 2 and 4, the system shifts; in steps 1 and 3, the program operations are carried out. All of the program operations of the seventeen program steps listed above can be accomplished by eight subprograms. These eight subprograms are listed below in Table 3.

TABLE 3. SUBPROGRAM OPERATIONS

| Sub-program | rpgram Steps | Control Flip-Flop | Operation |
|---|---|---|---|
| a. | 2, 8, 11, 13, 16 | 141 | Vacant |
| b. | 3, 4, 6 | 148 | Transfer one bubble across head 71. |
| c. | 13 | 153 | Transfer one bubble across head 71 if the write register 154 is one. |
| d. | 16 | 155 | Shift output from readout sense amplifier 211 into read resiter 156. |
| e. | 9, 12, 15 | 159 | Transfer data bubbles from data loops to transfer loop 61 across heads 62. |
| f. | 7, 14, 17 | 163 | Transfer data bubbles into data loops from transfer loop 61 across heads 62. |
| g. | 5 | 164 | Transfer bubbles from transfer loop 61 into row and column loops 78 and 79. |
| h. | 10 | 165 | Transfer bubbles from transfer loop 61 into control loop 76. |

In order not to confuse the subprograms with the program steps, each subprogram is identified by a letter *a* through *h*. Table 3 includes not only a brief definition of the individual subprograms, but also those program steps which utilize the subprograms and the flip-flop which controls the subprogram. The use of the flip-flops will become more apparent as the description proceeds below.

The clock pulse generator 137 is followed by a modulo 6 counter 138. The output of the clock generator 137 is applied directly to the stepping input of the subprogram counter 144, while the single output of the modulo 6 counter 138 is applied to the stepping inputs to the program 231, through gate 236 and counter 180, through the gate 183. This means that the subprogram counter 144 steps through six counts (one complete cycle) during the same time that the two program counters 231 and 180 step only from one count to the next. In order to initiate any subprogram, an output from one of the two program counters 231 or 180 and an output from the subprogram counter 144 must exist simultaneously. Which of the program counters 231 or 180 is used depends upon an input instruction which is applied to one of the instruction inputs 232 (to initiate preparation of the chip 51), 176 (to initiate a write routine), or 160 (to initiate a read routine). Consider first the preparation of the chip 51 for operation.

When a signal is applied to the input terminal 232 and the counter 231 is at rest (zero count), AND gate 233 has two input signals applied to it, and it opens to pass a pulse through OR gate 234 to set the flip-flop 235. The set output of the flip-flop 235 is applied as one input signal to the AND gate 236. When the next pulse output from the clock counter 138 appears, the gate 236 passes a pulse to drive the counter 231 to the count of one. This energizes line 98 to cause the clear driver circuit 237 to clear all of the registers to zero, and it applies a signal through the OR gate 238 to restore the flip-flop 235. The output from the clear driver 237, however, applies another signal through the gate 234 to set the flip-flop 105 again. On the next output from the clock counter 138, the counter 231 steps to the count of two. In the mean time, the counter 144 has been driven by the output from the clock generator 137 through its six counts. When the counter 231 is on the count of one, and the counter 144 is driven to its count of one, a signal passes through the OR gate 145 to apply one input signal to gages 149, 152, 157, 158, 168, 167, and 166. All of these gates are AND gates, and each requires one more input signal to open. The second input signals to these gates come from the set outputs of flip-flops 148, 153, 155, 159, 163, 164, and 165, respectively. Since none of these flip-flops are set, none of the gates open on either the count of one or the count of three of the counter 144. The counts of two and four of the counter 144 pass through the gate 146 and are applied as one input signal to AND gate 150. The other input signal to the gate 150 comes from the set output of flip-flop 153 which is not set. Thus, as the counter 144 counts through its six counts while the counter 231 is set at the count of one, the only thing that happens is that the registers are cleared.

When the counter 231 is driven to the count of two, and the counter 144 is driven through its six counts, line 127 is energized by counter 231, and this sets the flip-flop 239 and the flip-flop 141 through the gate 139. The set output from flip-flop 239 energizes the erase driver 206 through gate 233 to cause the transfer of all bubbles in the loop 61 that pass the transfer block 87 to transfer across that block. Setting the flip-flop 141 applies an input signal to the gate 143 to permit the next clock pulse to pass to step the counter 144 to the next count. On the count of one of the counter 144, the output is applied, again, to one input of each of the gates 149, 152, 157, 158, 168, 176, and 166. Since none of the flip-flops that supply the other inputs to these gates is set, none of the gates opens to cause the operation of any subprogram. Counts two and four are again applied to the input of gate 150 with no corresponding second input.

The counter 231 is now stepped to the count of three by the next output from the clock counter 138. This energizes line 128 which sets flip-flop 148 through the gate 147. Now, when the count of one or three from the counter 144 is applied to the gate 149, the set output from the flip-flop 148 is also applied to that gate, the gate 149 opens, and a signal is applied through the gate 151 to the write amplifier 215 and thereby to the write terminal 67 on the chip 51. This causes the transfer of bubbles from the generator 65 across the head transfer block 71 to the loop 61. On the count of two from the counter 144, the second input to the gate 149 is removed and the bubbles are shifted, only. On the count of three, the same procedure that occurred on the count of one is repeated, and on the count of four, the bubbles are again shifted only. On the count of five, the flip-flop 148 is restored and the counter 144 is returned to zero.

The next output from the clock counter 138 steps the counter 231 to the count of four. This energizes line 129 which sets the flip-flop 148 through the gate 147, and the operation described above is repeated.

When the counter 231 is stepped to the count of five, the output line 131 is energized and this sets the flip-flop 164. The set output from the flip-flop 164 applies one input signal to the AND gate 167. When the counter 144 is driven into its one count, a second input signal is applied to the gate 167 which opens to apply an input signal to the address driver 214. This energizes the address terminal 64 and the address line 70 on the chip 51 to transfer bubbles from the transfer loop 61 into the row and column mark loops 78 and 79. On the count of two from the counter 144, the gate 150 receives only one input signal, and the only thing that happens is the shifting of the bubbles one position clockwise. On the count of three, the gate 167 is again opened, and the address line 70 is again energized to transfer a second bubble into each of the row and column loops 78 and 79. On the fourth count, the bubbles are shifted one position clockwise, and on the fifth count, the counter 144 restores the flip-flop 164 and drives the counter 144 to zero.

The counter 231 next steps to its sixth count condition wherein the output line 227 is energized. Energizing line 227 applies a signal to the set input of the flip-flop 241 whose set output is applied as one input signal to the AND gate 242. The output from the clock counter 138 is the second signal applied to the input of gate 242, and that gate opens and remains open until one of the input signals is removed. The output of the gate 242 is applied to the set input of the flip-flop 148 through the gate 147. When the flip-flop 148 is set, its output applies one input signal to gate 149. Counts two and four of the counter 144 provide the second input signal for the gate 149, and when both input signals are present on gate 149, the write driver 215 is energized. This applies a signal to the write terminal 67 to transfer bubbles from the generator 65 across the transfer block 71 to the transfer loop 61. On the second and fourth counts of the counter 144, the bubbles in the chip 51 are shifted one position clockwise. The flip-flop 241 remains set, and the transfer block 71 remains energized, until the bubble 117 in the loop 78, bubble 115 in the loop 79, and bubble 112 in the loop 61 are adjacent the respective read heads 84, 83, and 74. When that condition is reached, the loop 61 has been filled with bubbles, they have been shifted one complete circuit, and all of the three sensing heads 84, 83, and 74 sense the presence of the bubbles. At this point all of the terminals 86, 85, and 209 have signals produced in them, and these signals are applied to the gate 245 together with the set output from the flip-flop 241. The gate 245 opens and restores the flip-flop 241, effectively terminating the sixth program step.

When the counter 231 is stepped to its seventh count, the line 132 is energized. Line 132 applies a signal to the set input of the flip-flop 163 through the OR gate 162. The set output of the flip-flop 163 is applied as one input signal to the AND gate 168 which opens on the first and third counts of the counter 144 to energize the transfer driver 212. This energizes the transfer line 63 through the transfer terminal 73 to cause bubbles in the loop 61 to transfer across those transfer blocks 62 into the loops 52–58 which they are adjacent. On the counts of two and four of the counter 144, the bubbles in the chip 51 are shifted one position clockwise. The sixth program step transfers two bubbles into the information loops 52–58 just as the fifth step transferred two bubbles into each of the row and column loops 78 and 79.

The next pulse out from the clock counter 138 drives the counter 231 into its eighth count condition and energizes the output line 226 which applies a signal through gate 236 to the set input of the flip-flop 237. The set output of the flip-flop 237 applies one input signal to the AND gate 238 and the output of the clock counter 138 applies the second input signal to the gate 238. The resulting output from the gate 238 passes through the OR gate 139 to set the flip-flop 141 and apply a conditioning signal to one input of the AND gate 143. Thereafter until the flip-flop 141 is restored, the clock pulses from the generator 137 pass through the gate 143 to step the counter 144. As the counter 144 is stepped through its counts, the bubbles in the chip 51 are driven in a clockwise direction. Since no other flip-flop has been set, nothing else takes place during this program step. After the bubbles in the loops 78 and 79 are driven completely through the loops until the bubbles 117 and 115 arrive adjacent the sensing heads 83 and 84, respectively; signals are applied to the terminals 85 and 86 and to the inputs of the gate 239. This opens gate 239 to pass a signal which restores the flip-flop 237 and removes the conditioning signal from the gate 238. Flip-flop 141 is then restored on the next count five output from the counter 144. In order to prevent the counter 231 from stepping to the next count until the circulation of the bubbles has been completed, the eight count output from the counter 231 is applied through the gate 238 to the restore input to the flip-flop 235 to restore that flip-flop. This removes the conditioning signal from the input of gate 236 and prevents the clock pulses from the clock counter 138 from stepping counter 231. When the signals appear at the terminals 85 and 86 to open gate 239, the output of that gate is applied, together with the eight count output of the counter 231 to the inputs of AND gate 121 which passes a signal through gate 234 to set the flip-flop 105. The next pulse from the clock counter 138 steps the counter 231 to its nine count.

On the ninth count, the counter 231 energizes the line 133 which applies a signal through the OR gate 161 to set the flip-flop 159. The set output of the flip-flop 159 applies a conditioning signal to the AND gate 158 which opens to pass the one and three count outputs of the counter 144. When signals pass through the gate 158, they energize the transfer driver 212 which applies a signal to the terminal 73 and line 63 in such a direction as to cause bubbles to move across the transfer blocks 62 from the information storage loops 52–58 to the transfer loop 61. This action occurs for each of the counts one and three of the counter 144, and during each of the counts two and four, the bubbles in the chip 51 are caused to move one position clockwise.

The next pulse from the clock counter 138 drives the counter 231 to the count of ten and energizes the line 224. This restores the flip-flop 239 to halt the erasing of the bubbles in the transfer loop 61, and it sets the flip-flop 123 to apply a conditioning signal to the AND gate 125. The other signal on the input to the gate 125 comes from the clock counter 138, and that signal passes through the gate 125 to set the flip-flop 165. The set output of the flip-flop 165 conditions the AND gate 166 to pass each of the one and three counts from the counter 144 so that the fault driver 214 is energized. This applies a signal to the terminal 69 to transfer the bubbles in the transfer loop 61 into the control loop 76 across the transfer block 72.

When line 224 was energized it also applied a signal through the gate 238 to restore the flip-flop 235, removing the conditioning signal from the gate 236, and preventing the stepping of the counter 231 by the output from the clock counter 138. This means that the program step ten continues until the bubbles in the transfer loop 61 have made a complete circuit of that loop. When this has occurred, the bubble 115 in the loop 69 is adjacent the head 83. A signal is produced thereby and is applied through the terminal 86 to the column driver 207. This applies a second signal to the AND gate 124 to restore the flip-flop 123. The conditioning signal is thereby removed from the gate 125 and the flip-flop 165 is restored by the next fifth count of the counter 144 and remains restored. At the same time, the output of the gate 124 is applied through the gate 234 to set the flip-flop 135 and applies a conditioning signal to the gate 236. The next pulse output from the clock counter 138 steps the counter 231 to the count of eleven.

When the counter 231 is at the count of eleven, the line 223 is energized. This applies a signal through the gate 238 to restore the flip-flop 235 and prevent the next output from the clock counter 138 from stepping the counter 231 any further, and it also applies a signal through the gate 246 to set the flip-flop 247. The set output from the flip-flop 247 conditions the gate 248 which passes a signal through the gate 139 to set the flip-flop 141. The flip-flop 141 applies a conditioning signal through the gate 142 to the gate 143 so that the clock pulses from the generator 137 steps the counter 144 repeatedly. Since no other flip-flop has been set, no action takes place during the counts of one and three of the counter 144. During each of the counts of two and four, the bubbles in the chip 51 are rotated one position clockwise. The shifting of the bubbles in the chip 51 continues until the bubble 115 in the column loop 79 is moved to a position adjacent the head 83, and the bubble 117 in the row loop 78 is simultaneously moved to a position adjacent the head 84. They produce signals in the two heads 83 and 84, which signals are applied through terminals 85 and 86 to the row and column drivers 208 and 207. The outputs from the drivers 207 and 208 are applied to the gate 119 which passes a signal to restore the flip-flop 247. This removes the signal applied to the set input of the flip-flop 141, permitting that flip-flop to be restored by the next count of five from the counter 144, removing the conditioning signal from the gate 143 to prevent further stepping of the counter 144. At the same time, the output from the gate 119 is applied through the gate 122 to the reset or clear input of the counter 231. This drives the counter 231 to zero and completes the preparation program.

The write and read programs operate in a similar fashion, but they are much shorter and they utilize the counter 180 rather than the counter 231. It will be recalled that the preparation program was initiated by the application of an instruction signal to the input terminal 232. In a similar manner, the write program is initiated by the application of an instruction signal to the input terminal 176, and the read program is initiated by the application of an instruction signal to the input terminal 160. Assume, now, that a computer or other source of instruction signals applies an input signal to the write terminal 176. The counter 180 is in its rest or zero condition. This applies two input signals to the AND gate 177 which opens to pass an output signal through the gate 179 to set the flip-flop 181. The set output from the flip-flop 181 is applied through the OR gate 182 to condition the AND gate 183. So long as that signal is present on the AND gate 183, the output pulses from the clock counter 138 pass through the gate 183 to step the counter 180. The set output of the flip-flop 181 is also applied through the gate 184 and the line 203 to the OR gate 243 (FIG. 12A). The output from the gate 243 energizes the erase driver 206 which applies a potential through the terminal 68 to the transfer block 87 causing bubbles which are in the transfer loop 61 to move across the block 87 to the annihilator 88. When the next pulse from the clock counter 138 passes through the gate 183, the counter 180 is stepped to its one count energizing the output line 175 and applying a signal through the OR gate 161 to set the flip-flop 159. The set output from the flip-flop 159 is applied as a conditioning signal to the gate 158 and also through the gate 142 as a conditioning signal to the gate 143. This permits the gate 143 to pass clock pulses from the generator 137 to step the counter 144. Each time the counter 144 counts to a one or a three, a signal is applied from the gate 145 to the other input of the gate 158 to energize the transfer driver 212. This applies a signal to the terminal 73 and to the transfer line 63 to cause bubbles which are contained in the information storage loops adjacent the transfer blocks 62 to be transferred from the information storage loops 52–58 into the transfer loop 61. On each of the counts of two and four of the counter 144, all of the bubbles in the chip 51 are rotated one position clockwise. When the counter 144 is stepped to its fifth count, a restore signal is applied to the flip-flop 159 removing the conditioning signal from the gate 158 and cutting off energization of its transfer line 63.

When the next pulse is transmitted from the clock counter 138, the counter 180 is stepped to its count of two applying conditioning signals to the gates 185 and 188. The flip-flop 181 was in its set condition, and this permits the signal to pass through the gate 185 to set the flip-flop 186. Immediately thereafter, however, the number two count output of the counter 180 is also applied through the gate 178 to restore the flip-flop 181. The set output of the flip-flop 186 passes a signal through gate 184 to the line 203. That signal is passed through the gate 243 to energize the erase driver 206 to cause the transfer of bubbles in the loop 61 across the transfer block 87 to the annihilator 88. The set output from the flip-flop 186 also applies a signal to the AND gate 191. Gate 191 also receives the output from the clock counter 138 and the output from the control sense amplifier 216. When there is a bubble in the control loop 76 adjacent the read head 75, a signal is applied to the terminal 218 and, therethrough, to the control sense amplifier 216. When there is no bubble in the control loop 76 adjacent the head 75, the control sense driver 216 is not energized and no signal is applied to the gate 191, but a signal is applied through the inverter 189 to the gate 192. The gate 192 also receives outputs from the clock counter 138 and the set output from the flip-flop 186. Assuming that a signal is passed to the terminal 218 to energize a driver 216, then the gate 191 energizes a line 172 which sets the flip-flop 153. The set output from the flip-flop 153 is applied to one input of the gate 150 and one input of the gate 152. The other input to the gate 150 comes from the counts of two and four of the counter 144. Whenever the flip-flop 153 is set and the counter 144 counts to two or four, the gate 150 is opened to apply a shift signal to write register 154. This steps the information contained in the write register 154 one place to the right so that the information appears at the output line of the register 154, which line is connected to one input of the gate 152. The other input of the gate 152 comes from the one and the trhee count outputs of the counter 144. Whenever there is information to be written at the last position to the right in the register 154, and the counter 144 has counted to one or to three, gate 152 passes a signal through the gate 151 to energize the write driver 215. This applies a signal to the terminal 67 to cause the transfer of bubbles from the generator 65 across the transfer block 71 to the transfer loop 61. Thus, one item of information is written into the transfer loop 61. Should there not be a bubble in the control loop 76 adjacent the head 75, then gate 191 remains closed and gate 192 opens. This energizes line 169 which applies a signal through the gate 139 to set the flip-flop 141 to permit the counter 144 to step to the next count. The operation continues with the bubbles on the chip 51 being driven one position clockwise each time the counter 144 counts a two or a four, until all of the bubbles in the chip 51 have made at least one complete circuit and the bubble 115 is adjacent the head 83. At this point a signal is applied to the terminal 86 and through the line 204 to the input of gate 187. The output of the gate 187 restores the flip-flop 186 removing one of the signals from the two gates 191 and 192 and also through the gate 179 to set the flip-flop 181. This again conditions the gate 183 to permit the pulses from the clock counter 138 to step the counter 180.

When the counter 180 receives the next pulse from the clock counter 138, it steps to its number three count which energizes the line 174. Line 174 then applies a signal through the OR gate 62 to set the flip-flop 163. This applies a conditioning signal to the AND gate 168 which opens whenever the counter 144 reaches a count of one or a count of three. The output from the gate 168 is applied to the other side of the transfer driver 212 to energize the transfer line 63 in a direction which causes the bubbles in the transfer loop 61 to be transferred across the transfer blocks 62 and into the information storage loops 52–58. As shown in FIG. 12B, driver 212 has two inputs. One input causes the driver 212 to produce a first polarity signal, and the other input causes driver 212 to produce a signal of the opposite polarity. When the counter 144 reaches its count of five, it restores the flip-flop 163 terminating any energization of the driver 212, and it restores the flip-flop 141 to remove the conditioning signal from the gate 143 and prevent further stepping of the counter 144. The next pulse from the clock counter 138 steps the counter 180 to its fourth count which applies a reset signal to the counter 180 to reset it to zero and also applies a signal through the gate 178 to restore the flip-flop 181 and remove the conditioning signals from the gates 185 and 183. This prevents further stepping of the counter 180 terminating the write program.

As shown in Table 2, steps 15 and 17 of the Read program are the same as steps 12 and 14 of the Write program. The Read program is initiated by the application of a Read instruction to the input terminal 160. This begins the counter 180 counting. When the counter 80 reaches the count of one, the same operation explained above in the Write program occurs. When the counter 180 reaches a count of two, a signal is applied to AND gate 188. When the read instruction had been applied to the terminal 160, the flip-flop 196 had been set by signals passed through the gates 193 and 195; the set output of flip-flop 196 had conditioned gate 188; and, as soon as the counter 180 reached its second count, gate 188 opened to set the flip-flop 198. The same signal that passed through the gate 188 also passed through gate 194 to restore the flip-flop 196. The set output of the flip-flop 198 is applied to the two AND gates 202 and 199. Gates 202 and 199 also have the output from the clock counter 138 applied to them. In addition, gate 202 has as its third input the output of the read sense driver 217, and the output of the driver 217 is applied to the gate 199 through an inverter 201. The driver 217 generates an output whenever there is a bubble adjacent the read head 77 in the control loop 76. When such a bubble is present, gate 202 opens to energize line 173 and set flip-flop 155—the read flip-flop. When such a bubble is not present, gate 199 opens to energize line 171 and set flip-flop 141 which permits the counter 144 to step. Setting the flip-flop 155 provides a conditioning signal to gate 157. A one and a three count of the counter 144 pass through the gate 157 to step the read register 156 one space so as to make room for additional information. At the same time, the reading head 74 supplies pulses to the terminal 209 and the read amplifier 211 each time a bubble in the transfer loop passes the head 74. The coutput of the amplifier 211 is applied to the read register for storage therein. Thus, as the bubbles in the transfer loop 61 pass the reading head 74, they generate signals which are stored in the read register 156. The register 156 is stepped one position each time a bubble in the control loop 76 passes the head 77. When no bubble is present in a bubble position in the control loop 76, the read register 156 is not stepped. This eliminates the blank spaces due to unused storage loops 52–58 and assures accurate information in the register 156.

The above description and drawings have disclosed a system for segregating faulty areas of memory systems and means for writing information into said memory and reading information from said memory while automatically avoiding said faulty areas. This specification has shown and described the invention with relation to a single thin magnetic film "chip" or memory element. However, the principles of this invention apply equally well to memories for the mass storage of digital information involving many such memory elements. In fact, one or more of such memory elements may be used exclusively to contain the control loops for the other memory elements. A single control loop or several control loops can be used for each memory elements. Whether a single element is used as a memory or several elements are so used, the entire memory must be provided with the same biasing magnetic field and the same rotating bubble driving magnetic field. Whether information is being written into or read out of the memory or not, the biasing field and the rotating field are both always active. In this manner the bubbles, once created, are maintained stable and they are continuously being driven through the magnetic film. Because the rotating magnetic field is always active, the bubbles 115 and 116 in the column loop 79 and bubbles 117 and 118 in the row loop 78 become very important. These bubbles synchronize the entire operation and control the times when information is written into and read out of the memory. Similarly, the bubbles in the control loop 76 are driven in synchronism with all of the other bubbles in the system and are thereby able to serve as the memory of those information storage loops which can store magnetic bubbles.

The above specification has described a new method and apparatus for determining which areas of memory devices are not suitable for storing digital data, for segregating said areas, and for preventing the subsequent writing of information into or the reading of information from those defective areas. It is realized that the above description may indicate to those skilled in the art additional ways in which the principles of this invention can be used without departing from its spirit. It is, therefore, intended that this invention be limited only by the scope of the appended claims.

What is claimed is:

1. The method of identifying and segregating flawed areas of thin magnetic film information storage systems in which digital information is stored by means of magnetic bubbles, said method comprising the steps of:

a. storing at least one magnetic bubble in each storage area in said thin magnetic film;

b. driving said magnetic bubbles completely through their respective storage areas in at least one complete cycle;

c. transferring the magnetic bubbles which complete said one cycle out of said respective storage areas and into a control storage area in a train of bubbles which contains gaps representing those storage areas through which the bubbles did not completely pass; and d. using the bubbles stored in said control area to control the subsequent transfer of digital information into said storage areas so that no information is transferred into those areas through which said magnetic bubbles did not completely pass.

2. The method of segregating faulty information storage loops in a thin magnetic film memory system which includes a plurality of information storage loops and at least one control loop, said method comprising the steps of:

a. inserting at least one bit of digital data into each of the information storage loops;

b. driving said bits of digital data through at least one complete traverse of said information loops;

c. transferring the bits of digital data which successfully complete one traverse of their respective loops into said control loop with gaps between bits representing the relative locations of these loops through which data bits did not successfully pass; and d. utilizing the contents of the control loop to determine into which information storage loops information is to be later stored.

3. The method of detecting and segregating flaws in a thin magnetic film memory system in which digital data is stored in the form of magnetic bubbles in storage loops defined in said thin magnetic film and which also includes a control loop and a transfer loop in bubble-transfer relation to said other loops, said method comprising the steps of:

a. inserting at least one magnetic bubble into each of said storage loops;

b. providing forces to drive the bubbles inserted into said storage loops completely through the flawless loops;

c. transferring into said transfer loop those bubbles which successfully completed at least one traverse of their respective storage loops to form in said transfer loop a train of magnetic bubbles in which train there are gaps between bubbles to represent the relative locations of those storage loops which have flaws;

d. transferring into the control loop in serial form the train of bubbles in said transfer loop; and e. utilizing the train of bubbles in said control loop to control the transfer of magnetic bubbles at a later time into and out of those loops which are represented by bubbles in said control loop.

4. The method defined in claim 3 further including the step of indexing the circulation of said bubbles through said information storage loops to ensure that the bubbles have been driven completely through their respective loops.

5. In a thin film magnetic memory system for storing digital information in said thin film in the form of magnetic bubbles apparatus for identifying and segregating those portions of said thin films which contain magnetic imperfections, said memory system including at least one anisotropic thin magnetic film, a plurality of information storage loops defined in said film, at least one of said loops comprising a transfer loop in close information transfer relation to the other of said loops, means for creating a fixed magnetic field perpendicular to the plane of said thin film for creating and maintaining magnetic bubbles in said film, means for creating a rotating magnetic field parallel to the plane of said thin film for driving magnetic bubbles contained therein around said loops, said apparatus comprising a control loop defined on said film, means for causing at least one magnetic bubble to be transferred into each of said loops for storing digital data, said rotating magnetic field causing said bubbles to completely traverse said information loops in at least one complete circuit, means for transferring those magnetic bubbles which complete one traverse of said loops into said transfer loops, means for transferring the contents of said transfer loop into said control loop, and means for sensing the contents of said control loop in subsequent information storage operations and for storing information only in those information storage loops represented by bubbles in said control loop.

6. The system defined in claim 5 in which said control loop is of a storage length at least one bubble position different from the storage length of the information storage loops.

7. In a thin magnetic film memory system which comprises at least one thin magnetic film, means for creating a magnetic bias at right angles to the plane of said film, means for generating a rotating electrical magnetic field in the plane of said film, and means for defining channels for the movement of magnetic bubbles in said film, apparatus for segregating portions of said film which contain magnetic anomolies, said apparatus comprising means for inserting at least one magnetic bubble into each information storage channel in said film, said rotating magnetic field driving said magnetic bubbles through said channels, means for recovering those bubbles which were driven completely through said channels, means for storing said recovered bubbles as the addresses of the channels through which information bubbles can pass freely, reading means adjacent said means for storing address bubbles for generating a signal whenever a bubble passes thereby, and means for preventing the writing of information when no such signal is generated.

8. The system defined in claim 7 wherein said means for storing addresses comprises a control register located in said memory system whereby said control register is subjected to the same magnetic fields and influences as the remainder of said memory system.

9. In a memory system, apparatus for segregating portions thereof which are not suitable for storing information, said memory system comprising a thin magnetic film, means for generating magnetic bubbles in said film, means for a generating a magnetic field at right angles to the plane of said film for maintaining said bubbles in stable conditions, means for defining channels of bubble movement in said film, said channels comprising at least a plurality of information storage loops, a transfer loop in bubble transferring relation with said information storage loops, means for selectively transferring bubbles into and out of said transfer loop, means for selectively transferring bubbles in both directions between said transfer loop and said storage loops; said apparatus including a control loop in said film in bubble transfer relation with said transfer loop, programming means for causing said apparatus to generate magnetic bubbles, transfer magnetic bubbles into said information storage loops, through said information storage loops and into said control loop to identify and segregate flawed portions of said memory system; said programming means comprising a sequencing means having at least one input and a plurality of outputs which are sequentially energized, said sequencing means being stepped to energize one output after another in response to pulses applied to said one input; and means for connecting individual outputs of said sequencing means to the individual inputs of said bubble generating means and said bubble transfer means.

10. The apparatus defined in claim 9 further including pulse generating means, and means for connecting the output of said pulse generating means to the input of said sequencing means.

11. The apparatus defined in claim 10 wherein the input to said means for transferring bubbles into said transfer loop comprises a write circuit which includes a write register in which the information to be written is stored; a write control flip-flop; and gating means for controlling the transfer of bubbles from said bubble generating means into said transfer loop in response to said write flip-flop, the information in said write register and an output of said sequencing means.

12. The apparatus defined in claim 11 wherein the input to said means for transferring bubbles between said transfer loop and said storage loops includes a first transfer flip-flop for controlling the transfer of bubbles into said storage loops and a second transfer flip-flop for controlling the transfer of bubbles out of said storage loops, each of said first and second transfer flip-flops being connected to a separate output of said sequencing means.

13. The apparatus defined in claim 12 further including read-write control units for carrying out repeated operations for writing information into said memory system and for reading information from said memory system, said read-write control units including a read-write stepping means having at least one input and a plurality of outputs, means for receiving from an external source a read instruction and means for receiving from an external source a write instruction, means responsive to the receipt of read or write instruction for initiating the operation of said read-write stepping means, and means responsive to the outputs from said read-write stepping means and to the contents of said control loop for causing the writing of information into said memory system and for causing the reading of information from said memory system.

14. The apparatus defined in claim 13 wherein said sequencing means is stepped through its sequence of output conditions by the pulse output of said pulse generating means, and wherein the sequence of output conditions of said sequencing means is arranged to set said write flip-flop to transfer into said transfer loop at least one bubble for each storage loop in said memory system, then to set said first transfer flip-flop to transfer at least one bubble from said transfer loop into each of said storage loops, then to render said control flip-flops quiescent until the bubbles in said storage loops have circulated completely around said loops, then to set said second transfer flip-flop to transfer those bubbles which have successfully completed the circuit of their storage loops into said transfer loop, and finally to set said first transfer flip-flop to transfer the contents of said transfer loop bubble-by-bubble into said control loop.

15. The apparatus defined in claim 14 wherein said write control unit includes a first write switch means responsive to a first output from said read-write stepping means and a write input instruction signal to generate an output signal, a second write switch means responsive to the output signal of said first write switch means and to a second output from said stepping means for generating an output signal, third write switch means responsive to the output signal from said second write switch means and to a third output from said stepping means and to the presence of a bubble in a particular location in said control loop to generate an output signal, means for applying the output signal from said third write switch means to said write control flip-flop to initiate the transfer of bubbles into said transfer loop, and a fourth write switch means responsive to the output signal from said second write switch means and to the third output from said stepping means and to the absence of a bubble from said particular location in said control loop to generate an output signal for stepping said apparatus to the next step.

16. The apparatus defined in claim 13 further including an information reading means comprising a sensor adjacent said transfer loop to generating a signal when a bubble is present in said transfer loop adjacent said sensor, and a register for storing the signals generated by said sensor.

17. The apparatus defined in claim 16 wherein said read control unit comprises first read switch means responsive to said read instruction and a first output from said read-write stepping means for generating an output signal, a second read switch means responsive to a second output from said read-write stepping means and to the output from said first read switch means to generate an output signal, a control sensor adjacent said control loop for generating an output signal when a bubble is present in said control loop adjacent said sensor, third read switch means responsive to the output signal from said second read switch means and to a third output from said read-write stepping means and to a signal from said control sensor to generate an output signal, a read control flip-flop, means for connecting the set output from said control flip-flop to said read register to shift the information stored therein to make room for the storage of additional information, and means for applying the output signal from said third read switch means to said read control flip-flop to set read control flip-flop and effect the storage of information from said read sensor in said read register.

18. The apparatus defined in claim 17 further including fourth read switch means responsive to the output signal from said second read switch means and the third output from said read-write stepping means and the absence of an output signal from said control sensor to generate an output signal for stepping the apparatus to the next step.

19. The system defined in claim 9 wherein said system includes a plurality of said thin magnetic films stacked parallel to each other, said means for generating a magnetic field being common to all of the films in said stack.

20. The system defined in claim 9 wherein said control loop is dimensioned to have a storage length at least one bubble position different from the storage length of said individual information storage loops.

21. The method of identifying and segregating flawed loops of a multiple loop information storage systems in which digital information is stored, said method comprising the steps of:

a. storing at least one information bit in each storage loop in said multi-loop system;

b. driving said information bits completely through their respective storage areas in at least one complete cycle;

c. transferring the bits which complete said one cycle out of said respective storage areas and into a control storage loop in a train of bits which contains gaps representing those storage areas through which the bits did not completely pass; and d. using the bits stored in said control loop to control the subsequent transfer of digital information into said storage loops so that no information is transferred into those loops through which said bits did not completely pass.

22. In a thin magnetic film memory system apparatus for segregating magnetic flaws in said film, said memory system comprising thin films of magnetic material, magnetic biasing means for supporting magnetic bubbles in said films, a plurality of information storage loops defined in said films, and a transfer loop defined in said film, said apparatus comprising a control loop defined in said film, means for loading at least one magnetic bubble into each of said information storage loops, means for driving said magnetic bubbles through a complete circuit of those of said information storage loops which contain no flaws, means for transferring the bubbles which have completely traversed their respective loops into said transfer loop, and means for utilizing the bubbles in said transfer loop to produce a sequence of bubbles and spaces in said control loop representing the relative positions of the flawed or unflawed storage loops.

23. In a thin magnetic film memory system apparatus for segregating magnetic flaws in said film, said memory system comprising thin films of magnetic material, magnetic biasing means for supporting magnetic bubbles in said films, a plurality of information storage loops defined in said films, and a transfer loop defined in said film, said apparatus comprising a control loop defined in said film, means for loading at least one magnetic bubble into each of said information storage loops, means for driving said magnetic bubbles through a complete circuit of those of said information storage loops which contain no flaws, means for transferring the bubbles which have completely traversed their respective loops into said transfer loop, and means for transferring the bubbles in said transfer loop into said control loop in series so that the relative positions of those storage loops which contain magnetic flaws are represented by empty spaces between bubbles.

24. The system defined in claim 23 further including a plurality of thin magnetic films arranged in a stack, said magnetic biasing means and said means for driving the magnetic bubbles being common to all films in the stack, each of said films including similar information storage and transfer loops, said stack also including one magnetic film having transfer and storage loops wherein said storage loops comprise the control loops for the other films in said stack.

25. The system defined in claim 23 which said control loop is of a storage length which is different from that of said information storage loops.

26. In a memory system for storing digital information in a tree pattern having a plurality of first branches, indexing means comprising a second branch, a transfer trunk for transferring information into and out of said first and second branches, means for inserting at least one control digit into said second branch, means for synchronizing the circulation of said control digit in said second branch with the circulation of digits in said first branches and said trunk, and first datum sensing means adjacent said second branch for sensing when said control digit has circulated to the datum position.

27. The memory system defined in claim 26 further including a third branch, means for inserting at least one control digit into said third branch, the circulation of the control digit in said third branch being synchronized with the circulation of digits in said first and second branches, and second datum sensing means adjacent said third branch for sensing when said control digit in said third branch has circulated to the datum position.

28. The memory system defined in claim 27 wherein the storage capacity of said third branch is at least one digit greater than the storage capacity of said second branch so that the digits in said second and third branches do not arrive at their datum positions at the same time until several circulations of information in said branches have taken place.

29. The memory system defined in claim 27 wherein the storage capacity of said third branch is at least one digit smaller than the storage capacity of said second branch so that the digits in said second and third branches do not arrive at their datum positions at the same time until several circulations of information in said branches have taken place.

* * * * *